United States Patent
Yoon et al.

(10) Patent No.: US 12,459,915 B2
(45) Date of Patent: Nov. 4, 2025

(54) BIARYL DERIVATIVE USEFUL AS DIACYLGLYCEROL ACYLTRANSFERASE 2 INHIBITOR, AND USE THEREOF

(71) Applicant: LG CHEM, LTD., Seoul (KR)

(72) Inventors: Seung Hyun Yoon, Seoul (KR); Hyun Woo Joo, Seoul (KR); Bo Kyung Seo, Seoul (KR); Eun Jin Lee, Seoul (KR); Jin Young Jung, Seoul (KR); Su Young Yoon, Seoul (KR); Woo Young Cho, Seoul (KR)

(73) Assignee: LG CHEM, LTD., Seoul (KR)

( * ) Notice: Subject to any disclaimer, the term of this patent is extended or adjusted under 35 U.S.C. 154(b) by 438 days.

(21) Appl. No.: 18/043,947

(22) PCT Filed: Sep. 3, 2021

(86) PCT No.: PCT/KR2021/011906
§ 371 (c)(1),
(2) Date: Mar. 3, 2023

(87) PCT Pub. No.: WO2022/050749
PCT Pub. Date: Mar. 10, 2022

(65) Prior Publication Data
US 2023/0322706 A1  Oct. 12, 2023

(30) Foreign Application Priority Data
Sep. 4, 2020 (KR) .................. 10-2020-0112843

(51) Int. Cl.
C07D 401/04 (2006.01)
C07D 241/20 (2006.01)
C07D 401/12 (2006.01)
C07D 401/14 (2006.01)

(52) U.S. Cl.
CPC ......... *C07D 401/04* (2013.01); *C07D 241/20* (2013.01); *C07D 401/12* (2013.01); *C07D 401/14* (2013.01)

(58) Field of Classification Search
CPC .................................................. C07D 401/04
See application file for complete search history.

(56) References Cited

U.S. PATENT DOCUMENTS

| 10,053,429 B2 | 8/2018 | Escribano et al. |
| 2015/0259323 A1 | 9/2015 | Cabral et al. |
| 2018/0051012 A1 | 2/2018 | Boehm et al. |

FOREIGN PATENT DOCUMENTS

| CN | 106103425 A | 11/2016 |
| CN | 109641875 A | 4/2019 |
| JP | 2017-507979 A | 3/2017 |
| JP | 2018-515554 A | 6/2018 |
| JP | 2019-524831 A | 9/2019 |
| KR | 10-1464429 B1 | 11/2014 |
| KR | 10-2016-0115997 A | 10/2016 |
| KR | 10-2019-0035897 A | 4/2019 |
| WO | 2010-069504 A1 | 6/2010 |
| WO | 2011-031628 A1 | 3/2011 |

OTHER PUBLICATIONS

Notice of Reasons for Refusal issued for Japanese Patent Application No. 2023-515025 on Apr. 22, 2024, 6 pages.
International Search Report issued for International Application No. PCT/KR2021/011906 on Dec. 17, 2021, 8 pages.

*Primary Examiner* — Golam M Shameem
(74) *Attorney, Agent, or Firm* — ROTHWELL, FIGG, ERNST & MANBECK, P.C.

(57) ABSTRACT

The present invention relates to a biaryl derivative compound, which exhibits the activity of a diacylglycerol acyltransferase 2 (DGAT2) inhibitor and is represented by chemical formula (1), a pharmaceutical composition comprising same as an active ingredient, and a use thereof.

9 Claims, No Drawings

BIARYL DERIVATIVE USEFUL AS DIACYLGLYCEROL ACYLTRANSFERASE 2 INHIBITOR, AND USE THEREOF

CROSS REFERENCE TO RELATED APPLICATION(S)

This application is a 35 U.S.C. 371 National Phase Entry Application from PCT/KR2021/011906 filed on Sep. 3, 2021, which claims priority to and the benefit of Korean Patent Application No. 10-2020-0112843 filed in the Korean Intellectual Property Office on Sep. 4, 2020, the entire contents of which are incorporated herein by reference.

TECHNICAL FIELD

The present invention relates to a biaryl derivative compound represented by Formula (1) showing inhibitory activity against diacylglycerol acyltransferase 2 (DGAT2), a pharmaceutical composition comprising the same as an active ingredient, and use thereof.

BACKGROUND ART

The improvement of living standards according to economic development, frequent consumption of instant foods, and changes to meat-based dietary habits caused excessive accumulation of caloric energy in the body. These changes in the dietary life of modern people have also led to a reduction in caloric energy consumption due to lack of exercise, leading to a serious prevalence of metabolic diseases such as obesity, hyperlipidemia, diabetes, cardiovascular disease and coronary artery disease. Specifically, obesity is one of the rapidly increasing diseases and is reported to be the cause of metabolic diseases such as diabetes. The development of therapeutic agents for metabolic diseases by controlling the functions of enzymes involved in the biosynthetic pathway of triglycerides—which is the main cause of obesity—is drawing attention.

Neutral fats, such as triglycerides (TG), play a very important role in the storage function as an energy source in the body. However, when neutral fats are excessively accumulated in organs or tissues, they cause obesity, hypertriglyceridemia, fatty liver, etc., thereby causing serious diseases such as diabetes, arteriosclerosis, metabolic abnormalities and hypofunction of organs. Diacylglycerol acyltransferase—which is a crucial enzyme in the biosynthesis of triglycerides—is found in various tissues of mammals, and is an enzyme that synthesizes TG by binding fatty acyl-CoA to the hydroxyl group of diacylglycerol in the final step of the glycerol phosphate pathway which is the main pathway for triglyceride synthesis. At present, two isoforms—DGAT1 and DGAT2—are known. Although their biochemical functions are similar, there is a difference in that DGAT1 is mainly expressed in the small intestine and adipose tissue, and DGAT2 is mainly expressed in the liver and adipose tissue. In addition, with respect to the gene family, DGAT1 belongs to the ACAT family, and DGAT2 belongs to the MGAT family. As such, it is expected that their role in TG biosynthesis is also different.

Several studies, including animal studies, have shown that DGAT2 primarily contributes to the biosynthesis of TG in vivo. Unlike DGAT2 knockout mice—which hardly synthesize TG and die shortly after birth due to an abnormal skin layer, DGAT1 knockout mice showed a slight decrease in TG levels and no problems with the survival of the mice (Stone S J et al., 2000. Nat. Genet. 25: 87-90). In addition, as a result of reducing the expression level of DGAT1 or DGAT2 by using antisense oligonucleotide (ASO) in an animal model of fatty liver, fatty liver symptoms were alleviated and the rate of glucose production in the liver was significantly reduced only when the amount of DGAT2 was reduced (Choi C S et al., 2007. Hepatology. 45: 1366-74).

The underlying molecular mechanisms have not been fully elucidated, but it has been thought that the inhibition of DGAT2 results in down-regulation of the expression of multiple genes encoding proteins involved in lipid production, such as sterol regulatory element-binding proteins 1c (SREBP1c) and stearoyl CoA-desaturase 1 (SCD1). At the same time, it has been thought that the oxidative pathway was induced by an increase in genes such as carnitine palmitoyltransferase 1 (CPT1). This change in turn leads to a decrease in hepatic DAG and TAG lipid levels, and thus improved insulin responsiveness in the liver. In addition, the inhibition of DGAT2 inhibited hepatic VLDL TAG secretion and reduced circulating cholesterol levels. Finally, plasma apolipoprotein B (APOB) levels were suppressed, which was thought to be due to the reduced supply of TAG in the lipidation of the newly synthesized APOB protein. That is, when DGAT2 is inhibited, beneficial effects on both glycemic control and plasma cholesterol profile showed, which means that the inhibition of DGAT2 can be applied to the treatment of metabolic disorders.

DISCLOSURE OF INVENTION

Technical Problem

An object of the present invention is to provide a novel biaryl derivative compound represented by Formula (1) showing inhibitory activity against diacylglycerol acyltransferase 2 (DGAT2).

Another object of the present invention is to provide a method of preparing the biaryl derivative compound.

Still another object of the present invention is to provide a pharmaceutical composition for the treatment of metabolic diseases associated with DGAT2 comprising the biaryl derivative compound as an active ingredient, and a method for preparing thereof.

Still another object of the present invention is to provide a method for treating metabolic diseases associated with DGAT2 in a subject in which efficacy in animal models of diseases is improved as well as efficacy and convenience in taking in the subject are improved by using the biaryl derivative compound as an active ingredient having improve physical and chemical properties compared to conventional compounds.

Solution to Problem

In order to achieve the above object, the present invention provides a compound of the following Formula (1), or a pharmaceutically acceptable salt or isomer:

[Formula (1)]

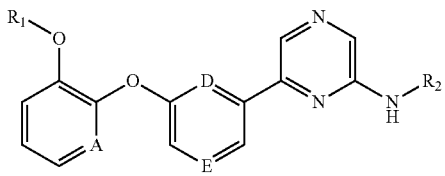

wherein

A, D and E are each independently CH or N;

$R_1$ is alkyl, cycloalkyl or haloalkyl;

$R_2$ is -G-J-L;

wherein G is —C(=O)— or a direct bond;

J is alkylene, alkenylene, alkylene-arylene, alkenylene-arylene, alkoxyene-arylene, arylene, heteroarylene-heterocycloalkylene, heteroarylene-arylene or heteroarylene-oxy-cycloalkylene;

L is hydrogen, halo, amino, nitro, carboxy (—COOH), carboxyalkyl, carboxyalkoxy, cycloalkyl or aryl;

wherein the alkyl, alkylene, carboxyalkyl, carboxyalkoxy or aryl is optionally substituted with one or more substituents selected from hydroxy, halo, alkyl and alkoxy; and the heterocycloalkylene or heteroarylene includes one or more heteroatoms selected from N, O and S.

The compound of Formula (1) according to the present invention may form a pharmaceutically acceptable salt. A pharmaceutically acceptable salt may include an acid-addition salt which is formed from an inorganic acid such as hydrochloric acid, sulfuric acid, nitric acid, phosphoric acid, hydrobromic acid and hydroiodic acid; an organic acid such as tartaric acid, formic acid, citric acid, acetic acid, trichloroacetic acid, trifluoroacetic acid, gluconic acid, benzoic acid, lactic acid, fumaric acid, maleic acid and salicylic acid; or sulfonic acid such as methanesulfonic acid, ethanesulfonic acid, benzenesulfonic acid and p-toluenesulfonic acid, which form non-toxic acid-addition salt including pharmaceutically acceptable anion. In addition, a pharmaceutically acceptable carboxylic acid salt includes the salt with alkali metal or alkali earth metal such as lithium, sodium, potassium, calcium and magnesium; salts with amino acid such as lysine, arginine and guanidine; an organic salt such as dicyclohexylamine, N-methyl-D-glucamine, tris(hydroxymethyl)methylamine, diethanolamine, choline and triethylamine. The compound of Formula (1) according to the present invention may be converted into their salts by conventional methods.

Meanwhile, since the compound of Formula (1) according to the present invention can have an asymmetric carbon center and asymmetric axis or plane, they can exist as E- or Z-isomer, R- or S-isomer, racemic mixtures or diastereoisomer mixtures and each diastereoisomer, all of which are within the scope of the present invention.

Herein, unless indicated otherwise, the term "the compound of Formula (1)" is used to mean all the compounds of Formula (1), including the pharmaceutically acceptable salts and isomers thereof.

Herein, the following concepts defined to the substituents are used to define the compound of Formula (1).

The term "halogen" or "halo" means fluoride (F), chlorine (Cl), bromine (Br) or iodine (I).

The term "alkyl" or "alkylene" means straight or branched hydrocarbons, may include a single bond, a double bond or a triple bond, and is preferably $C_1$-$C_{10}$ alkyl or $C_1$-$C_{10}$ alkylene, or $C_1$-$C_7$ alkyl or $C_1$-$C_7$ alkylene. Examples of alkyl include, but are not limited to, methyl, ethyl, n-propyl, i-propyl, n-butyl, i-butyl, tert-butyl, acetylene, vinyl, trifluoromethyl and the like.

The term "alkenyl" or "alkenylene" means straight or branched hydrocarbons having at least one carbon-carbon double bond, and is preferably $C_2$-$C_{10}$ alkenyl or $C_2$-$C_{10}$ alkenylene, or $C_2$-$C_7$ alkenyl or $C_2$-$C_7$ alkenylene. Examples of alkenyl include, but are not limited to, vinyl, allyl, butenyl, isopropenyl, isobutenyl and the like.

The term "cycloalkyl" means partially or fully saturated single or fused ring hydrocarbons, and is preferably $C_3$-$C_{10}$-cycloalkyl. Examples of cycloalkyl include, but are not limited to, cyclopropyl, cyclobutyl, cyclopentyl, cyclohexyl, cycloheptyl and the like.

Unless otherwise defined, the term "alkoxy" means alkyloxy having 1 to 10 carbon atoms.

The term "aryl" or "arylene" means aromatic hydrocarbons, preferably $C_5$-$C_{12}$ aryl or $C_5$-$C_{12}$ arylene, more preferably $C_6$-$C_{10}$ aryl or $C_6$-$C_{10}$ arylene, and includes, but is not limited to, phenyl, naphthyl and the like.

The term "heteroaryl" or "heteroarylene" means 3- to 12-membered, more preferably 5- to 12-membered aromatic hydrocarbons which form a single or fused ring—which may be fused with benzo or $C_3$-$C_8$ cycloalkyl—including one or more heteroatoms selected from N, O and S as a ring member. Examples of heteroaryl include, but are not limited to, pyridinyl, pyrimidinyl, pyridazinyl, pyrazinyl, oxadiazolyl, isoxadiazolyl, tetrazolyl, triazolyl, indolyl, indazolyl, isoxazolyl, oxazolyl, thiazolyl, isothiazolyl, furanyl, benzofuranyl, imidazolyl, thiophenyl, benzthiazole, benzimidazole, quinolinyl, indolinyl, 1,2,3,4-tetrahydroisoquinolyl, 3,4-dihydroisoquinolinyl, thiazolopyridyl, 2,3-dihydrobenzofuran, 2,3-dihydrothiophene, 2,3-dihydroindole, benzo[1,3]dioxin, chroman, thiochroman, 1,2,3,4-tetrahydroquinoline, 4H-benzo[1,3]dioxin, 2,3-dihydrobenzo[1,4]-dioxin, 6,7-dihydro-5H-cyclopenta[d]pyrimidine and the like.

The term "heterocycloalkyl" or "heterocycloalkylene" means partially or fully saturated hydrocarbons which form a single or fused ring including one or more heteroatoms selected from N, O and S, and is preferably 3- to 12-membered heterocycloalkyl or heterocycloalkylene, or 5- to 12-membered heterocycloalkyl or heterocycloalkylene. Examples of heterocycloalkyl or heterocycloalkylene include, but are not limited to, pyrrolidinyl, piperidinyl, morpholinyl, imidazolinyl, piperazinyl, tetrahydrofuran, tetrahydrothiofuran and the like.

According to one embodiment of the present invention, in the above Formula (1)

A, D and E are each independently CH or N;

$R_1$ is $C_1$-$C_7$ alkyl, $C_3$-$C_{10}$ cycloalkyl or halo-$C_1$-$C_7$ alkyl;

$R_2$ is -G-J-L;

wherein G is —C(=O)— or a direct bond;

J is $C_1$-$C_7$ alkylene, $C_2$-$C_7$ alkenylene, $C_1$-$C_7$ alkylene-$C_6$-$C_{10}$ arylene, $C_2$-$C_7$ alkenylene-$C_6$-$C_{10}$ arylene, $C_1$-$C_7$ alkoxyene-$C_6$-$C_{10}$ arylene, $C_6$-$C_{10}$ arylene, 5- to 12-membered heteroarylene-5- to 12-membered heterocycloalkylene, 5- to 12-membered heteroarylene-$C_6$-$C_{10}$ arylene or 5- to 12-membered heteroarylene-oxy-$C_3$-$C_{10}$ cycloalkylene;

L is hydrogen, halo, amino, nitro, carboxy, carboxy-$C_1$-$C_7$ alkyl, carboxy-$C_1$-$C_7$ alkoxy, $C_3$-$C_{10}$ cycloalkyl or $C_6$-$C_{10}$ aryl;

wherein the alkyl, alkylene, carboxyalkyl, carboxyalkoxy or aryl is optionally substituted with 1 to 4 substituents selected from hydroxy, halo, $C_1$-$C_7$ alkyl and $C_1$-$C_7$ alkoxy; and the heterocycloalkylene or heteroarylene includes 1 to 4 heteroatoms selected from N, O and S.

Representative compounds of Formula (1) according to the present invention include, but are not limited to, the following compounds:

N-(6-(5-(2-ethoxyphenoxy)pyridin-3-yl)pyrazin-2-yl)-3-phenylpropanamide;

methyl 2-(4-(2-((6-(5-(2-ethoxyphenoxy)pyridin-3-yl)pyrazin-2-yl)amino)-2-oxoethyl)phenyl)acetate;

2-(4-(2-((6-(5-(2-ethoxyphenoxy)pyridin-3-yl)pyrazin-2-yl)amino)-2-oxoethyl)phenyl)acetic acid;
2-(4-(3-((6-(5-(2-ethoxyphenoxy)pyridin-3-yl)pyrazin-2-yl)amino)-3-oxopropyl)phenyl)acetic acid;
methyl 2-(4-(3-((6-(5-(2-ethoxyphenoxy)pyridin-3-yl)pyrazin-2-yl)amino)-3-oxopropyl)phenyl)-2-methylpropanoate;
ethyl 2-(4-(2-((6-(5-(2-ethoxyphenoxy)pyridin-3-yl)pyrazin-2-yl)amino)-2-oxoethyl)phenyl)-2,2-difluoroacetate;
3-(4-(2-((6-(5-(2-ethoxyphenoxy)pyridin-3-yl)pyrazin-2-yl)amino)-2-oxoethyl)phenyl)-2,2-dimethylpropanoic acid;
(R)-1-(2-((6-(5-(2-ethoxyphenoxy)pyridin-3-yl)pyrazin-2-yl)amino)pyrimidin-4-yl)piperidine-3-carboxylic acid;
3-(3-(6-((6-(5-(2-ethoxyphenoxy)pyridin-3-yl)pyrazin-2-yl)amino)pyridin-2-yl)phenyl)-2,2-dimethylpropanoic acid;
N-(6-(3-(2-ethoxyphenoxy)phenyl)pyrazin-2-yl)-3-phenylpropanamide;
2-(4-(2-((6-(3-(2-ethoxyphenoxy)phenyl)pyrazin-2-yl)amino)-2-oxoethyl)phenyl)acetic acid;
2-(4-(3-((6-(3-(2-ethoxyphenoxy)phenyl)pyrazin-2-yl)amino)-3-oxopropyl)phenyl)acetic acid;
2-(4-(3-((6-(3-(2-ethoxyphenoxy)phenyl)pyrazin-2-yl)amino)-3-oxopropyl)phenoxy)-2-methylpropanoic acid;
2-(4-(2-((6-(3-(2-ethoxyphenoxy)phenyl)pyrazin-2-yl)amino)-2-oxoethyl)phenyl-2,2-difluoroacetic acid;
3-(4-(2-((6-(3-(2-ethoxyphenoxy)phenyl)pyrazin-2-yl)amino)-2-oxoethyl)phenyl)-2,2-dimethylpropanoic acid;
2-(4-(3-((6-(3-(2-ethoxyphenoxy)phenyl)pyrazin-2-yl)amino)-3-oxopropyl)phenyl)-2-methylpropanoic acid;
(E)-2-(4-(3-((6-(3-(2-ethoxyphenoxy)phenyl)pyrazin-2-yl)amino)-3-oxopro-1-phen-1-yl)phenyl)-2-methylpropanoic acid;
3-(4-(1-((6-(3-(2-ethoxyphenoxy)phenyl)pyrazin-2-yl)amino)-2-methyl-1-oxopropan-2-yl)phenyl)-2,2-dimethylpropanoic acid;
2-(4-(2-((6-(3-(2-ethoxyphenoxy)phenyl)pyrazin-2-yl)amino)-2-oxoethyl)phenoxy-2-methylpropanoic acid;
2-(4-(2-((6-(3-(2-ethoxyphenoxy)phenyl)pyrazin-2-yl)amino)pyrimidin-4-yl)phenyl)acetic acid;
(1r,4r)-4-((2-((6-(3-(2-ethoxyphenoxy)phenyl)pyrazin-2-yl)amino)pyrimidin-4-yl)oxy)cyclohexane-1-carboxylic acid;
N-(6-(6-(2-ethoxyphenoxy)pyridin-2-yl)pyrazin-2-yl)-3-phenylpropanamide;
3-(4-(2-((6-(6-(2-ethoxyphenoxy)pyridin-2-yl)pyrazin-2-yl)amino)-2-oxoethyl)phenyl)-2,2-dimethylpropanoic acid;
(R)-1-(2-((6-(6-(2-ethoxyphenoxy)pyridin-2-yl)pyrazin-2-yl)amino)pyrimidin-4-yl)piperidine-3-carboxylic acid;
3-(3-(6-((6-(6-(2-ethoxyphenoxy)pyridin-2-yl)pyrazin-2-yl)amino)pyridin-2-yl)phenyl)-2,2-dimethylpropanoic acid;
2-(4-(3-((6-(3-((3-ethoxypyridin-2-yl)oxy)phenyl)pyrazin-2-yl)amino)-3-oxopropyl)phenyl)-2-methylpropanoic acid;
3-(4-(2-((6-(3-((3-ethoxypyridin-2-yl)oxy)phenyl)pyrazin-2-yl)amino)-2-oxoethyl)phenyl)-2,2-dimethylpropanoic acid;
2-(4-(3-((6-(3-((3-ethoxypyridin-2-yl)oxy)phenyl)pyrazin-2-yl)amino)-3-oxopropyl)phenoxy)-2-methylpropanoic acid;
3-(4-(1-((6-(3-((3-ethoxypyridin-2-yl)oxy)phenyl)pyrazin-2-yl)amino)-2-methyl-1-oxopropane-2-yl)phenyl)-2,2-dimethylpropanoic acid;
2-(4-(2-((6-(3-((3-ethoxypyridin-2-yl)oxy)phenyl)pyrazin-2-yl)amino)-2-oxoethyl)phenoxy)-2-methylpropanoic acid;
(R)-1-(2-((6-(3-((3-ethoxypyridin-2-yl)oxy)phenyl)pyrazin-2-yl)amino)pyrimidin-4-yl)piperidine-3-carboxylic acid;
3-(3-(6-((6-(3-((3-ethoxypyridin-2-yl)oxy)phenyl)pyrazin-2-yl)amino)pyridin-2-yl)phenyl)-2,2-dimethylpropanoic acid; and
(1r,4r)-4-((2-((6-(3-((3-ethoxypyridin-2-yl)oxy)phenyl)pyrazin-2-yl)amino)pyrimidin-4-yl)oxy)cyclohexane-1-carboxylic acid.

The terms and abbreviations used herein retain their original meanings unless indicated otherwise.

The present invention also provides a method for preparing the compound of Formula (1). Hereinafter, the method for preparing the compound of Formula (1) is explained based on exemplary reactions in order to illustrate the present invention. However, a person skilled in the art could prepare the compound of Formula (1) by various methods based on the structure of Formula (1), and such methods should be interpreted as being within the scope of the present invention. That is, the compound of Formula (1) may be prepared by the methods described herein or by combining various methods disclosed in the prior art, which should be interpreted as being within the scope of the present invention. Accordingly, a method for preparing the compound of Formula (1) is not limited to the following methods.

The compound of formula (1) of the present invention may be prepared by directly introducing a substituted amine group into compound (2), or introducing a protected amine into compound (2), removing the protecting group to obtain compound (3) and carrying out an amidation reaction on compound (3), according to the method of Reaction Scheme 1 below.

[Reaction Scheme 1]

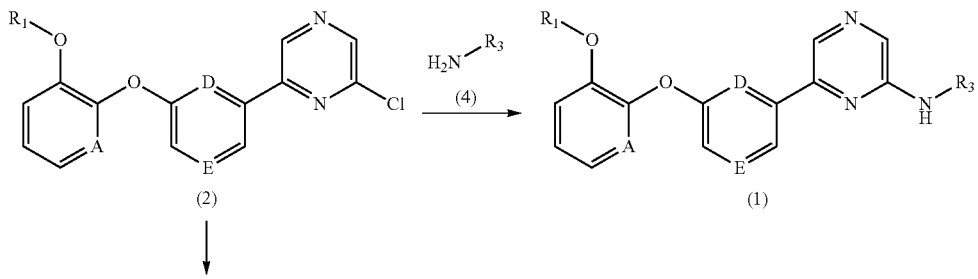

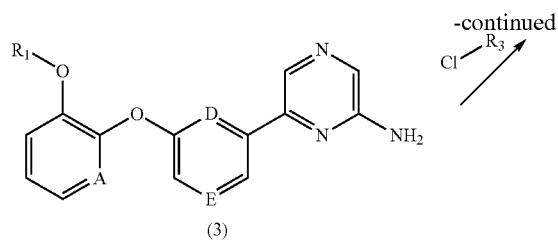

Compound (2) may be prepared by using 2-ethoxyphenol as a starting material according to the method of Reaction Scheme 2 below.

[Reaction Scheme 2]

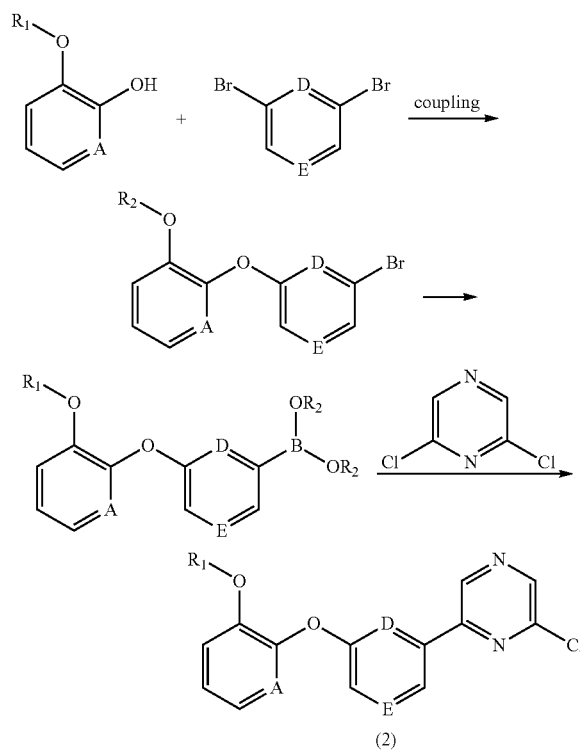

In addition, compound (3) may be prepared according to the method of Reaction Scheme 3 below.

[Reaction Scheme 3]

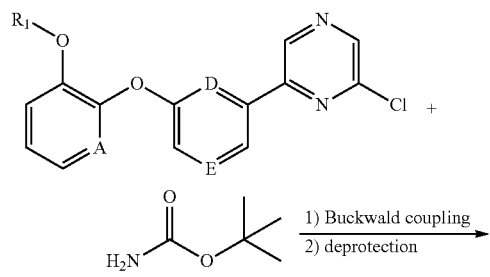

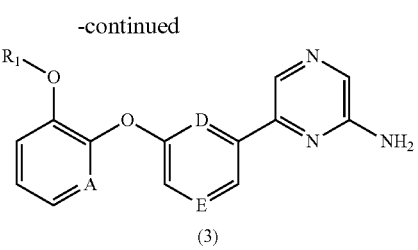

Among the compounds of formula (4), amide derivatives may be obtained by the treatment with thionyl chloride or oxalyl chloride from an appropriate acid followed by the treatment with ammonia water. For example, methyl 4-(3-amino-3-oxopropyl)benzoate may be prepared according to the method of Reaction Scheme 4 below. Among the compounds of formula (4), amine derivatives may be obtained by introducing an amino group into a compound obtained through a cross-coupling reaction between a dioxaborolane core intermediate and various kinds of chloro aryl compounds to synthesize amino aryl intermediates. For example, ethyl 2-(4-(2-aminopyrimidin-4-yl)phenyl)acetate may be prepared according to the method of Reaction Scheme 5 below.

[Reaction Scheme 4]

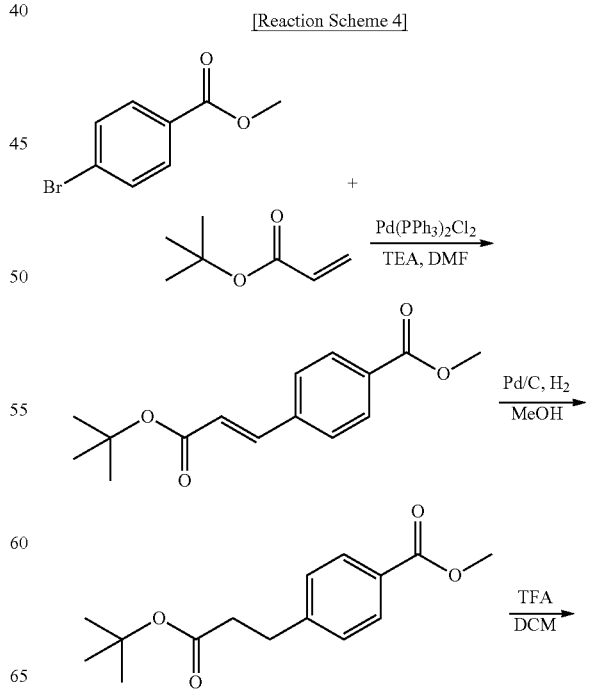

-continued

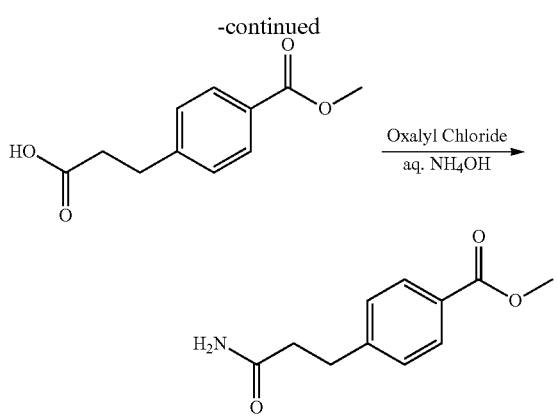

[Reaction Scheme 5]

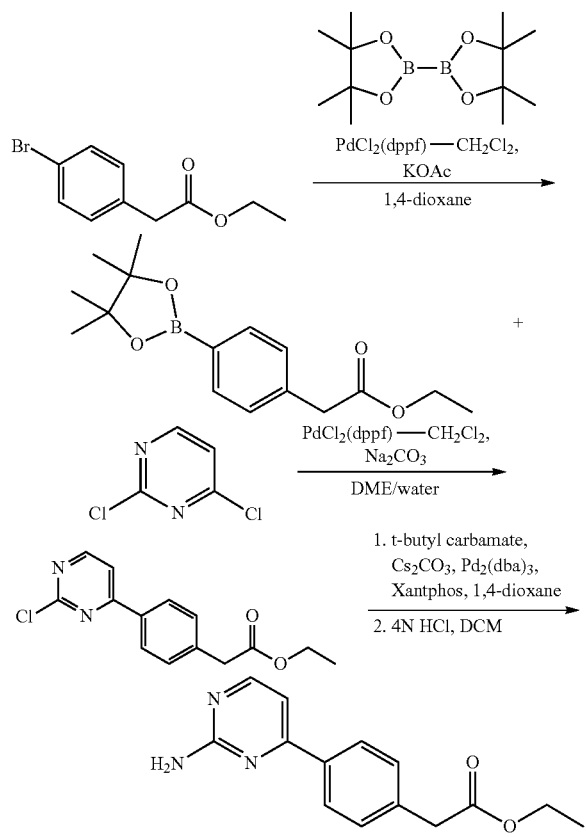

A compound not specifically described in the preparation method of the present specification is a known compound or a compound that can be easily synthesized from a known compound by a known synthesis method or a similar method.

The compound of Formula (1) obtained by the above methods can be separated or purified from the reaction products by conventional methods such as recrystallization, ionospheresis, silica gel column chromatography or ion-exchange chromatography.

As explained above, the compounds according to the present invention, starting materials or intermediates for the preparation thereof can be prepared by a variety of methods, which should be interpreted as being within the scope of the present invention in respect to the preparation of the compound of Formula (1).

The compound of Formula (1) according to the present invention exhibits inhibitory activity against diacylglycerol acyltransferase 2 (DGAT2). Accordingly, the present invention provides a pharmaceutical composition for the treatment of diseases associated with DGAT2 comprising the compound of Formula (1), or a pharmaceutically acceptable salt or isomer thereof, together with a pharmaceutically acceptable carrier. Various kinds of prodrugs, which are converted into the compound of Formula (1) in vivo, are also within the scope of the present invention.

Exemplary diseases associated with DGAT2 which can be treated by the pharmaceutical composition according to the present invention include, but are not limited to, that selected from the group consisting of fatty liver, nonalcoholic steatohepatitis (NASH), nonalcoholic fatty liver disease (NAFLD), diabetes, obesity, hyperlipidemia, atherosclerosis and hypercholesterolemia.

In the present invention, a "pharmaceutical composition" may include other components such as carriers, diluents, excipients, etc., in addition to the active ingredient of the present invention. Accordingly, the pharmaceutical composition may include pharmaceutically acceptable carriers, diluents, excipients or combinations thereof, if necessary. The pharmaceutical composition facilitates the administration of compounds into the body. Various methods for administering the compounds include, but are not limited to, oral, injection, aerosol, parenteral and local administration.

Herein, a "carrier" means a compound that facilitates the addition of compounds into the cell or tissue. For example, dimethylsulfoxide (DMSO) is a conventional carrier facilitating the administration of many organic compounds into living cells or tissues.

Herein, a "diluent" means a compound that not only stabilizes a biologically active form but is diluted in solvent dissolving the compounds. A dissolved salt in buffer is used as a diluent in this field. A conventionally used buffer is a phosphate buffer saline mimicking salt form in body fluid. Since a buffer solution can control the pH of the solution at low concentration, a buffer diluent hardly modifies the biological activity of compounds.

Herein, "pharmaceutically acceptable" means such property that does not impair the biological activity and physical property of compounds.

The compounds according to the present invention can be formulated as various pharmaceutically administered dosage forms. In the preparation of the pharmaceutical composition of the present invention, an active component—specifically, the compound of Formula (1) or a pharmaceutically acceptable salt or isomer thereof—is mixed with selected pharmaceutically acceptable carriers considering the dosage form to be prepared. For example, the pharmaceutical composition of the present invention can be formulated as injections, oral preparations and the like, as needed.

The compound of the present invention can be formulated by conventional methods using known pharmaceutical carriers and excipients, and inserted into a unit or multi-unit containers. The formulations may be solution, suspension or emulsion in oil or aqueous solvent and include conventional dispersing agents, suspending agents or stabilizing agents. In addition, the compound may be, for example, dry powder form which is dissolved in sterilized pyrogen-free water before use. The compound of the present invention can be formulated into suppositories by using a conventional suppository base such as cocoa butter or other glycerides. Solid forms for oral administration include capsules, tablets, pills, powders and granules. Capsules and tablets are preferred. Tablets and pills are preferably enteric-coated. Solid forms are manufactured by mixing the compounds of the present invention with at least one carrier selected from inert diluents such as sucrose, lactose or starch, lubricants such as magnesium stearate, disintegrating agents, binders and the like.

The compound or a pharmaceutical composition comprising the same according to the present invention can be administered in combination with other drugs—for example, other metabolic disorder therapeutic agents—as required.

The dose of the compound of Formula (1) according to the present invention is determined by a physician's prescription considering the patient's body weight, age and disease condition. A typical dose for adults is in the range of about 0.3 to 500 mg per day according to the frequency and intensity of administration. A typical daily dose of intramuscular or intravenous administration for adults is in the range of about 1 to 300 mg per day which can be administered in divided unit dosages. Some patients need a higher daily dose.

Herein, the term "treatment" is used to mean deterring, delaying or ameliorating the progress of diseases in a subject exhibiting symptoms of diseases.

EFFECTS OF THE INVENTION

The novel biaryl derivative compound of Formula (1) according to the present invention exhibits excellent inhibitory activity against diacylglycerol acyltransferase 2 (DGAT2), and thus can be usefully used in the prevention, alleviation or treatment of metabolic disorders associated with DGAT2. In addition, the novel biaryl derivative compound of Formula (1) according to the present invention exhibits increased lipophilicity and liver selectivity, thereby improving efficacy through increased exposure to the liver, as well as expecting the advantages of convenience in taking because the half-life is relatively long in disease animal models and clinical practice.

MODE FOR THE INVENTION

Hereinafter, the present invention is explained in more detail with the following examples. However, it must be understood that the protection scope of the present invention is not limited to the examples.

In the following examples, M refers to molar concentration, and N refers to normal concentration. In addition, the descriptions of abbreviations and terms used in the Reaction Scheme, Preparation Examples and Examples are as follows:

DCM: dichloromethane
DIPEA: N,N-diisopropylethylamine
DMF: N,N-dimethylformamide
DMSO: dimethylsulfoxide
NMP: N-methylpyrrolidone
Pd(dppf)Cl$_2$·CH$_2$Cl$_2$: [1,1'-bis(diphenylphosphino)ferrocene]dichloropalladium (II) dichloromethane complex (1:1)
TEA: triethylamine
THF: tetrahydrofuran
PyBroP: bromotripyrrolidinophosphonium hexafluorophosphate Preparation Example 1: Synthesis of 2-chloro-6-(5-(2-ethoxyphenoxy)pyridin-3-yl)pyrazine

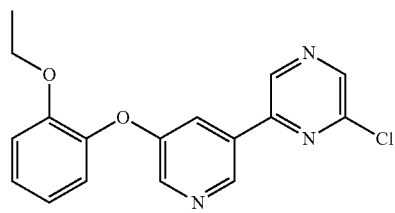 [SMILES: CCOc1ccccc1Oc1cncc(-c2cncc(Cl)n2)c1]

Step 1: Synthesis of 3-bromo-5-(2-ethoxyphenoxy)pyridine

60% sodium hydride (1.82 g, 46 mmol) was added to NMP (100 ml) at 0° C., and 2-ethoxyphenol (6.1 g, 44 mmol) was slowly added dropwise thereto in the presence of nitrogen. After stirring the reaction solution at room temperature for 1 hour, 3,5-dibromopyridine (7.2 g, 30.4 mmol) was added dropwise thereto and stirred at 150° C. for 72 hours. After the reaction was completed, the reaction mixture was cooled to room temperature, diluted with water (120 ml), 5N aqueous sodium hydroxide solution (15 ml) was added, and extracted with ether. After drying over magnesium sulfate, the solvent was removed under reduced pressure, and the purification was carried out by column chromatography to obtain the desired product (yield: 19.5%).

$^1$H NMR (500 MHz, CHLOROFORM-D): δ8.32 (d, J=1.2 Hz, 1H), 8.26 (d, J=2.4 Hz, 1H), 7.28 (s, 1H), 7.20 (s, 1H), 7.09 (d, J=7.9 Hz, 1H), 7.04-6.87 (m, 2H), 4.01 (t, J=7.0 Hz, 2H), 1.24 (t, J=7.0 Hz, 3H)

Step 2: Synthesis of (5-(2-ethoxyphenoxy)pyridin-3-yl)boronic acid

3-Bromo-5-(2-ethoxyphenoxy)pyridine (1.74 g, 5.92 mmol) obtained in Step 1, 4,4,4',4',5,5,5',5'-octamethyl-2,2'-bi(1,3,2-dioxaborolane) (2.25 g, 8.87 mmol, 1.5 eq), potassium acetate (2.32 g, 23.66 mmol) and Pd(dppf)Cl$_2$·CH$_2$Cl$_2$ (48 mg, 0.06 mmol) were added to toluene (30 mL) and stirred under reflux at 120° C. for 12 hours. After the reaction was completed, the reaction mixture was filtered through a Celite pad, washed with toluene, the solvent was removed under reduced pressure, and the next reaction was carried out without a separate purification process.

m/z (M+H)$^+$ calculated for C$_{13}$H$_{14}$BNO$_4$: 259.0, found 260.1

Step 3: Synthesis of 2-chloro-6-(5-(2-ethoxyphenoxy)pyridin-3-yl)pyrazine (5-(2-Ethoxyphenoxy)pyridin-3-yl)boronic acid (1.53 g, 5.92 mmol) obtained in Step 2, 2,6-dichloropyrazine (0.97 g, 6.5 mmol, 1.1 eq), sodium carbonate (1.25 g, 11.81 mmol) and Pd(dppf)Cl$_2$·CH$_2$Cl$_2$ (48 mg, 0.06 mmol) were added to 1,4-dioxane (20 mL)/water (1 ml) and stirred under reflux at 120° C. for 12 hours. After the reaction was completed, the resultant was filtered through a Celite pad, washed with toluene, the solvent was removed under reduced pressure, and the purification was carried out by column chromatography to obtain the desired product (two-step yield: 39%).

¹H-NMR (400 MHz, CHLOROFORM-D) δ8.90 (s, 2H), 8.57 (s, 1H), 8.41 (d, j=4 Hz, 1H), 7.81 (d, J=4 Hz, 1H), 7.20 (m, 1H), 7.13 (m, 1H), 7.02 (m, 2H), 4.06 (q, 2H), 1.24 (t, 3H)

Preparation Example 2: Synthesis of 2-chloro-6-(3-(2-ethoxyphenoxy)phenyl) pyrazine

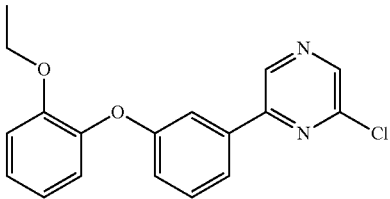 [SMILES: CCOc1ccccc1Oc1cccc(-c2cncc(Cl)n2)c1]

Step 1: Synthesis of 1-(3-bromophenoxy)-2-ethoxybenzene

2-Ethoxyphenol (4.33 g, 31.4 mmol), 1-bromo-3-iodobenzene (6 ml, 47.1 mmol), copper(I) chloride (1.553 g, 15.69 mmol), 2,2,6,6-tetramethyl-3,5-heptadione (1.310 ml, 6.27 mmol) and cesium carbonate (10.22 g, 31.4 mmol) were dissolved in 70 ml of NMP and heated to 120° C. After stirring for 16 hours, the reaction mixture was cooled to room temperature. The reaction was terminated with a 1N aqueous hydrochloric acid solution, followed by extraction with diethyl ether. The organic layer was washed with brine, dried over magnesium sulfate, and the organic solvent was removed under reduced pressure. The purification was carried out by silica gel column (ethyl acetate:hexane=1:5) to obtain the desired product (yield: 96%).

¹H-NMR (500 MHz, CHLOROFORM-D) δ: 7.14-7.12 (m, 3H), 7.04-7.03 (m, 2H), 7.00-6.98 (m, 1H), 6.97-6.93 (m, 1H), 6.88-6.86 (m, 1H), 4.03 (q, 2H, J=7.35 Hz), 1.26 (t, 3H, J=7.03 Hz)

Step 2: Synthesis of 2-(3-(2-ethoxyphenoxyphenyl)-4,4,5,5-tetramethyl-1,3,2-dioxaborolane 1-(3-Bromophenoxy)-2-ethoxybenzene (1.74 g, 5.94 mmol) obtained in Step 1, 4,4,4',4',5,5,5',5'-octamethyl-2,2'-bi(1,3,2-dioxaborolane) (2.26 g, 8.90 mmol, 1.5 eq), potassium acetate (2.33 g, 23.74 mmol) and Pd(dppf)Cl₂·CH₂Cl₂ (48 mg, 0.06 mmol) was added to toluene (30 mL) and stirred under reflux at 120° C. for 12 hours. After the reaction was completed, the resultant product was filtered through a Celite pad, washed with toluene, the solvent was removed under reduced pressure, and the purification was carried out by column chromatography to obtain the desired product (yield: 45%).

¹H-NMR (500 MHz, CHLOROFORM-D): δ7.48 (d, 1H), 7.43 (s, 1H), 7.28 (t, 1H), 7.09 (t, 1H), 6.94~7.03 (m, 4H), 4.06 (q, 2H), 1.32 (s, 12H), 1.28 (t, 3H)

Step 3: Synthesis of 2-chloro-6-(3-(2-ethoxyphenoxy)phenyl)pyrazine 2-(3-(2-Ethoxyphenoxyphenyl)-4,4,5,5-tetramethyl-1,3,2-dioxaborolane obtained in Step 2 (0.9 g, 2.65 mmol), 2,6-dichloropyrazine (0.43 g, 2.91 mmol, 1.1 eq), sodium carbonate (0.56 g, 5.29 mmol) and Pd(dppf)Cl₂·CH₂Cl₂ (22 mg, 0.03 mmol) were added to 1,4-dioxane (20 ml)/water (1 ml) and stirred under reflux at 120° C. for 12 hours. After completion of the reaction, the resultant product was filtered through a Celite pad, wash with toluene, the solvent was removed under reduced pressure, and the purification was carried out by column chromatography to obtain the desired product (yield: 75%).

¹H-NMR (500 MHz, CHLOROFORM-D) δ8.85 (s, 1H), 8.49 (s, 1H), 7.68 (d, 1H), 7.61 (s, 1H), 7.40 (t, 1H), 7.14 (t, 1H), 7.05 (d, J=6 Hz, 1H), 7.02 (d, J=6 Hz, 2H), 6.95 (t, 1H), 4.05 (q, 2H), 1.26 (t, 3H)

Preparation Example 3: Synthesis of 2-chloro-6-(6-(2-ethoxyphenoxy)pyridin-2-yl)pyrazine

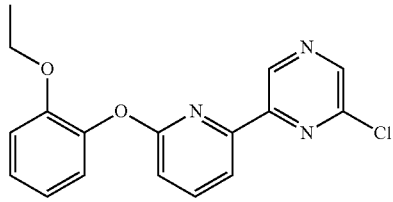

2-Ethoxyphenol (1.5 g, 10.86 mmol) and 2,6-dibromopyridine (3.86 g, 16.28 mmol) were used in a similar manner to Preparation Example 2 to obtain the desired product (yield: 44.9%).

m/z (M+H)+ calculated for C₁₇H₁₄ClN₃O₂: 327.77, found 328.0

Preparation Example 4: Synthesis of 2-chloro-6-(3-((3-ethoxypyridin-2-yl)oxy)phenyl)pyrazine

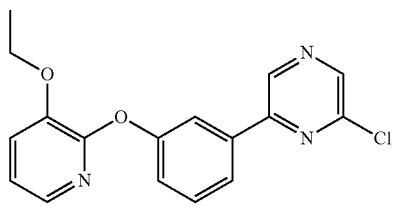 [SMILES: CCOc1cccnc1Oc1cccc(-c2cncc(Cl)n2)c1]

Step 1: Synthesis of 3-ethoxypyridine 1-oxide

3-Ethoxypyridine (1.683 g, 13.67 mmol) was dissolved in DCM (32.5 ml), and m-chloroperoxybenzoic acid (3.07 g, 17.77 mmol) was then added thereto at 10° C. and stirred at room temperature for 22 hours. Sodium thiosulfate was added and stirred at 15° C. for 3 hours. After the reaction was completed, the resultant product was extracted with DCM. The solvent was removed under reduced pressure, and the purification was carried out by column chromatography to obtain the desired product (yield: 87%).

¹H-NMR (500 MHz, CHLOROFORM-D) δ7.96 (t, J=2.0 Hz, 1H), 7.92-7.83 (m, 1H), 7.15 (dd, J=8.7, 6.3 Hz, 1H), 6.86 (dd, J=8.5, 2.1 Hz, 1H), 4.05 (q, J=7.0 Hz, 2H), 1.44 (t, J=6.9 Hz, 3H)

Step 2: Synthesis of 2-(3-bromophenoxy)-3-ethoxypyridine

3-Ethoxypyridine 1-oxide (825 mg, 5.93 mmol) obtained in Step 1 and 3-bromophenol (1.02 g, 5.93 mmol) were dissolved in THF (19 ml), and DIPEA (3.83 ml, 21.94 mmol) and PyBroP (3.59 g, 7.71 mmol) was added thereto and stirred at room temperature for 17 hours. After completion of the reaction, the resultant product was concentrated under reduced pressure, diluted with DCM, and the organic layer was washed with 1N aqueous sodium hydroxide solution. The resultant product was dried over magnesium sulfate, the organic solvent was removed under reduced pressure, and the purification was carried out by silica gel column to obtain the desired product (yield: 88%).

$^1$H-NMR (400 MHz, CHLOROFORM-D): δ7.73 (dd, J=5.0, 1.4 Hz, 1H), 7.28 (td, J=3.4, 1.8 Hz, 2H), 7.24-7.19 (m, 2H), 7.12-7.02 (m, 2H), 7.02-6.91 (m, 1H), 6.82-6.66 (m, 1H), 4.13 (q, J=7.0 Hz, 2H), 1.46 (td, J=7.1, 4.6 Hz, 3H)

Step 3: Synthesis of 2-chloro-6-(3-((3-ethoxypyridin-2-yl)oxy)phenyl)pyrazine 2-(3-Bromophenoxy)-3-ethoxypyridine (1.54 g, 5.24 mmol) obtained in Step 2, was used in a similar manner to Steps 2 and 3 of Preparation Example 2 to obtain the desired product (yield: 24.4%).

$^1$H-NMR (400 MHz, CHLOROFORM-D): δ8.90 (s, 1H), 8.49 (s, 1H), 7.84 (dd, J=8.7, 1.4 Hz, 2H), 7.71 (dd, J=4.8, 1.6 Hz, 1H), 7.52 (t, J=7.8 Hz, 1H), 7.33-7.26 (m, 1H), 7.24-7.15 (m, 1H), 6.98 (dd, J=7.8, 5.0 Hz, 1H), 4.17 (q, J=7.0 Hz, 2H), 1.48 (t, J=7.1 Hz, 3H)

Preparation Example 5: Synthesis of 3-phenylpropanamide

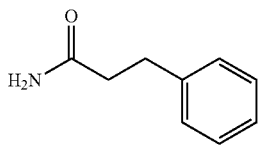 [SMILES: NC(=O)CCc1ccccc1]

3-Phenylpropanoyl chloride (4.5 ml, 30.3 mmol) dissolved in THF (46 mL) was added dropwise to aqueous ammonia (189 ml) at 0° C., followed by stirring for 1 hour. The organic solvent was removed under reduced pressure, diluted with water and extracted with ethyl acetate. The organic solvent was dried over magnesium sulfate and removed under reduced pressure. The purification was carried by silica gel column to obtain the desired product (yield: 100%).

$^1$H-NMR (500 MHz, CHLOROFORM-D): δ7.29-7.25 (m, 2H), 7.22-7.20 (m, 3H), 5.44 (s, 1H), 5.35 (s, 1H), 2.97 (t, J=7.6 Hz, 2H), 2.53 (t, J=7.6 Hz, 2H)

Preparation Example 6: Synthesis of methyl 2-(4-(2-amino-2-oxoethyl)phenyl)acetate

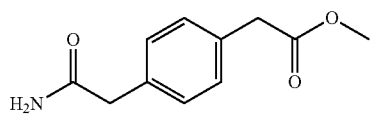

Step 1: Synthesis of dimethyl 2,2'-(1,4-phenylene)diacetate

Acetyl chloride (2.9 ml, 40.8 mmol) was slowly added dropwise to methanol (20 ml) at 0° C. Then, 1,4-phenylenediacetic acid (4.0 g, 20.6 mmol) was dissolved, and the reaction mixture was stirred under reflux for 5 hours. After confirming that the reaction was completed by TLC, the resultant product was cooled to room temperature, and the organic solvent was removed under reduced pressure. The reaction product was diluted with 100 mL of ethyl acetate, washed with an aqueous sodium hydrogen carbonate solution and brine, dried over magnesium sulfate, and the organic solvent was removed under reduced pressure to obtain the desired product.

$^1$H-NMR (500 MHz, CHLOROFORM-D): δ7.24 (s, 2H), 3.68 (s, 3H), 3.61 (s, 2H)

Step 2: Synthesis of 2-(4-(2-methoxy-2-oxoethyl)phenyl)acetic acid

Dimethyl 2,2'-(1,4-phenylene)diacetate (4.58 g, 20.6 mmol) obtained in Step 1 was dissolved in THF (30 ml) and methanol (10 ml), and 10 ml of 2N sodium hydroxide was slowly added dropwise thereto and stirred at room temperature for 3 hours. The organic solvent was removed under reduced pressure, diluted with water, and acidified with 2N hydrochloric acid solution. After extraction with ethyl acetate, the organic solvent was dried over magnesium sulfate and removed under reduced pressure. The recrystallization was carried out to obtain the desired product (yield: 30%).

$^1$H-NMR (500 MHz, CHLOROFORM-D): δ7.25 (d, J=4.9 Hz, 4H), 3.68 (s, 3H), 3.66-3.62 (2H), 3.61 (s, 2H)

Step 3: Synthesis of methyl 2-(4-carbamoylphenoxy)-2-methylpropanoate 2-(4-(2-Methoxy-2-oxoethyl)phenyl)acetic acid (1.0 g, 4.8 mmol) obtained in Step 2 was dissolved in 30 ml of dichloromethane, and thionyl chloride (0.7 ml, 9.6 mmol) was slowly added dropwise at room temperature. After stirring at room temperature for 4 hours, the organic solvent was removed under reduced pressure. The resultant product was dissolved in 5 ml of THF and then slowly added dropwise to 25% aqueous ammonia solution at 0° C. After stirring for 1 hour, the resultant solid was filtered to obtain the desired product (yield: 74%).

$^1$H-NMR (500 MHz, DMSO-D6): δ7.42 (s, 1H), 7.15 (dd, J=12.2, 7.9 Hz, 4H), 6.83 (s, 1H), 3.60 (s, 2H), 3.57 (d, J=4.3 Hz, 3H), 3.30 (s, 2H)

Preparation Example 7: Synthesis of methyl 2-(4-(3-amino-3-oxopropyl)phenyl)acetate

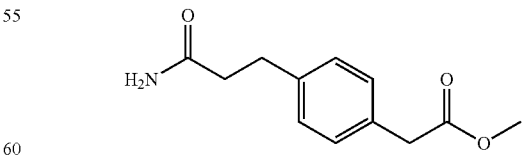

Step 1: Synthesis of tert-butyl (E)-3-(4-(2-methoxy-2-oxoethyl)phenyl)acrylate Methyl 2-(4-bromophenyl)acetate (16.4 g, 71.56 mmol), tert-butyl acrylate (18.0 g, 143.0 mmol) and triethylamine (50 mL, 0.35 mol) were dissolved in 200 ml of dimethylformamide. After removing dissolved oxygen through nitrogen bubbling, bis(triphenylphosphine)palladium dichloride (2.5 g, 3.58 mmol) was added dropwise and stirred at 75° C. for 12 hours. The organic solvent was removed under reduced pressure, diluted with ethyl acetate, washed with brine, dried over magnesium sulfate, and then the organic solvent was removed under reduced pressure. The purification was carried out by silica gel column (ethyl acetate:hexane=1:3) to obtain the desired product (yield: 79%).

$^1$H-NMR (500 MHz, CHLOROFORM-D): δ7.56 (d, J=15.9 Hz, 1H), 7.46 (d, J=8.7 Hz, 2H), 7.28 (d, J=7.9 Hz, 2H), 6.34 (d, J=15.9 Hz, 1H), 3.70 (s, 3H), 3.64 (s, 2H), 1.53 (s, 9H)

Step 2: Synthesis of tert-butyl 3-(4-(2-methoxy-2-oxoethyl)phenyl)propanoate

Tert-butyl (E)-3-(4-(2-methoxy-2-oxoethyl)phenyl)acrylate (5.0 g, 18.0 mmol) obtained in Step 1 was dissolved in 50 ml of methanol, and palladium charcoal (0.5 g, 0.452 mmol) was added dropwise thereto. The reduction reaction was carried out by the use of a hydrogen balloon. After confirming that the reaction was completed, the resultant product was filtered with a Celite pad, and the organic solvent was removed under reduced pressure to obtain the desired product (yield: 93%).

$^1$H-NMR (500 MHz, CHLOROFORM-D): δ7.17 (dd, J=18.3, 7.9 Hz, 4H), 3.68 (s, 3H), 3.59 (s, 2H), 2.88 (t, J=7.9 Hz, 2H), 2.52 (t, J=7.6 Hz, 2H), 1.41 (s, 9H)

Step 3: Synthesis of 3-(4-(2-methoxy-2-oxoethyl)phenyl)propanoic acid

Tert-butyl 3-(4-(2-methoxy-2-oxoethyl)phenyl)propanoate (4.67 g, 16.8 mmol) obtained in Step 2 was dissolved in 100 ml of a 20% trifluoroacetic acid/dichloromethane solution and stirred at room temperature for 2 hours. After confirming that the reaction was completed, the organic solvent was removed under reduced pressure, and the recrystallization was carried out to obtain the desired product (yield: 100%).

$^1$H-NMR (500 MHz, CHLOROFORM-D): δ9.58 (s, 2H), 7.18 (dd, J=19.0, 7.9 Hz, 4H), 3.70 (s, 3H), 3.61 (s, 2H), 2.95 (t, J=7.6 Hz, 2H), 2.69 (t, J=7.9 Hz, 2H)

Step 4: Synthesis of methyl 2-(4-(3-amino-3-oxopropyl)phenyl)acetate 3-(4-(2-Methoxy-2-oxoethyl)phenyl)propanoic acid (3.73 g, 16.8 mmol) obtained in Step 3 was used in a similar manner to Step 3 of Preparation Example 6 to obtain the desired product (yield: 65%).

$^1$H-NMR (500 MHz, CHLOROFORM-D): δ7.18 (q, J=7.7 Hz, 4H), 5.41 (s, 2H), 3.66 (d, J=15.9 Hz, 3H), 3.59 (s, 2H), 3.02-2.87 (2H), 2.51 (t, J=7.6 Hz, 2H)

Preparation Example 8: Synthesis of methyl 2-(4-(3-amino-3-oxopropyl)phenyl-2-methylpropanoate Step 1: Synthesis of tert-butyl (E)-3-(4-(1-methoxy-2-methyl-1-oxopropan-2-yl)phenyl)acrylate Methyl 2-(4-bromophenyl)-2-methylpropanoate (1.0 g, 3.89 mmol) and tert-butyl acrylate (0.98 g, 7.8 mmol) were used in a similar manner to Step 1 of Preparation Example 7 to obtain the desired product (yield: 79%).

$^1$H-NMR (500 MHz, CHLOROFORM-D): δ7.56 (dd, J=15.9, 4.3 Hz, 1H), 7.51-7.42 (2H), 7.41-7.31 (m, 2H), 6.34 (dd, J=15.9, 4.9 Hz, 1H), 3.66 (d, J=4.9 Hz, 3H), 1.58 (d, J=4.9 Hz, 6H), 1.53 (d, J=4.9 Hz, 9H)

Step 2: Synthesis of methyl 2-(4-(3-(tert-butoxy)-3-oxopropyl)phenyl)-2-methylpropanoate Tert-butyl (E)-3-(4-(1-methoxy-2-methyl-1-oxopropan-2-yl)phenyl)acrylate (0.93 g, 3.06 mmol) obtained in Step 1 was used in a similar manner to Step 2 of Preparation Example 7 through a reduction reaction to obtain the desired product (yield: 96%).

$^1$H-NMR (500 MHz, CHLOROFORM-D): δ7.23 (s, 2H), 7.15 (d, J=7.9 Hz, 2H), 3.63 (s, 3H), 2.87 (t, J=7.9 Hz, 2H), 2.52 (t, J=7.9 Hz, 2H), 1.55 (s, 6H), 1.40 (s, 9H)

Step 3: Synthesis of 3-(4-(1-methoxy-2-methyl-1-oxopropan-2-yl)phenyl)propanoic acid Methyl 2-(4-(3-(tert-butoxy)-3-oxopropyl)phenyl)-2-methylpropanoate (0.90 g, 2.92 mmol) obtained in step 2 was used in a similar manner to Step 3 of Preparation Example 7 to obtain the desired product (yield: 96%).

$^1$H-NMR (500 MHz, CHLOROFORM-D): δ7.26 (d, J=7.3 Hz, 2H), 7.16 (d, J=7.9 Hz, 2H), 3.66 (s, 3H), 3.03-2.84 (2H), 2.82-2.55 (2H), 1.56 (s, 6H)

Step 4: Synthesis of methyl 2-(4-(3-amino-3-oxopropyl)phenyl)-2-methylpropanoate 3-(4-(1-Methoxy-2-methyl-1-oxopropan-2-yl)phenyl) propanoic acid (0.7 g, 2.8 mmol) obtained in Step 3 was used in a similar manner to Step 3 of Preparation Example 6 through the amidation reaction to obtain the desired product (yield: 99%).

$^1$H-NMR (500 MHz, CHLOROFORM-D): δ7.25 (dd, J=6.4, 2.1 Hz, 2H), 7.17 (d, J=7.9 Hz, 2H), 5.36 (s, 2H), 3.64 (s, 3H), 3.00-2.90 (2H), 2.52 (t, J=7.6 Hz, 2H), 1.56 (d, J=4.3 Hz, 6H)

Preparation Example 9: Synthesis of 2-(4-(2-ethoxy-1,1-difluoro-2-oxoethyl)phenyl)acetic acid

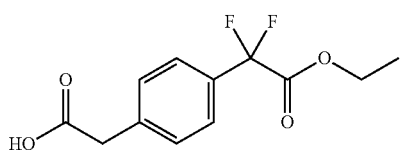

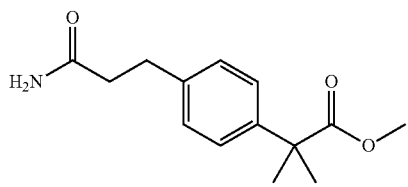 [SMILES: COC(=O)C(C)(C)c1ccc(CCC(N)=O)cc1]

Step 1: Synthesis of tert-butyl 2-(4-iodophenyl)acetate

Tert-butanol (130 ml) was added to 2-(4-iodophenyl) acetic acid (13.0 g, 49.6 mmol) and stirred with nitrogen bubbling until it became transparent. Di-tert-butyl dicarbonate (10.83 g, 49.6 mmol) was added and stirred until dissolved, then 4-dimethylaminopyridine (6.06 g, 49.6 mmol) was added thereto and stirred at room temperature for 1 hour. The organic solvent was concentrated under reduced pressure, and the purification was carried out by silica gel column (ethyl acetate:n-hexane=1:9) to obtain the desired product (yield: 68.9%).

$^1$H-NMR (500 MHz, CHLOROFORM-D): δ7.63 (d, J=7.95 Hz, 2H), 7.01 (d, J=8.55 Hz, 2H), 3.45 (s, 2H), 1.42 (s, 9H)

Step 2: Synthesis of ethyl 2-(4-(2-(tert-butoxy)-2-oxoethyl)phenyl)-2,2-difluoroacetate Tert-butyl 2-(4-iodophenyl)acetate (8.4 g, 26.4 mmol) obtained in Step 1 and 2-bromo-2,2-difluoroacetate (5.36 g, 26.4 mmol) were added to activated copper powder (4.37 g, 68.6 mmol) dissolved in DMSO (80 ml). After stirring at 60° C. for 12 hours, the resultant product was poured into ice and an aqueous ammonium chloride solution, followed by extraction with diethyl ether. The organic layer was washed with an aqueous ammonium chloride solution and brine, and then dried over magnesium sulfate. The organic layer was concentrated under reduced pressure and purified by silica gel column (ethyl acetate:n-hexane=1:9) to obtain the desired product (yield: 60%).

$^1$H-NMR (400 MHz, CHLOROFORM-D): δ7.56 (d, J=8 Hz, 2H), 7.36 (d, J=8 Hz, 2H), 4.31 (q, J=8 Hz, 2H), 1.44 (s, 9H), 1.30 (t, J=8 Hz, 3H)

Step 3: Synthesis of 2-(4-(2-ethoxy-1,1-difluoro-2-oxoethyl)phenyl)acetic acid Ethyl 2-(4-(2-(tert-butoxy)-2-oxoethyl)phenyl)-2,2-difluoroacetate (5 g, 15.91 mmol) obtained in Step 2 was dissolved in DCM (10 ml), and trifluoroacetic acid (15 ml) dissolved in DCM (50 ml) was then added thereto and stirred at room temperature for 1 hour. After adding toluene and removing the solvent under reduced pressure, the desired product was obtained without further purification (yield: 100%).

$^1$H-NMR (500 MHz, CHLOROFORM-D): δ7.58 (d, J=7.95 Hz, 2H), 7.37 (d, J=7.95 Hz, 2H), 4.28 (q, J=6.7 Hz, 2H), 3.69 (s, 2H), 1.30 (t, J=7.03 Hz, 3H)

Preparation Example 10: Synthesis of tert-butyl 3-(4-(2-amino-2-oxoethyl)phenyl)-2,2-dimethylpropanoate

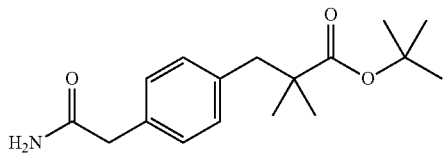 [SMILES: CC(C)(C)OC(=O)C(C)(C)Cc1ccc(CC(N)=O)cc1]

Step 1: Synthesis of 2-(4-(3-tert-butoxy-2,2-dimethyl-3-oxopropyl)phenyl)acetic acid Diisopropylamine (14.0 ml, 98 mmol) was added to anhydrous tetrahydrofuran (164 ml), and 2.5 M n-butyllithium (39.3 ml, 98 mmol) was slowly added dropwise thereto at −78° C. The reaction solution was stirred at the same temperature for 20 minutes. After raising the temperature to room temperature and stirring for 10 minutes, the reaction solution was lowered to −78° C. again and stirred for 10 minutes. To the reaction solution, tert-butyl isobutyrate (14.16 g, 98 mmol) dissolved in anhydrous tetrahydrofuran (163 ml) was added dropwise. The reaction solution was stirred at −78° C. for 1 hour and slowly added dropwise to 2-(4-(bromomethyl)phenyl)acetic acid (7.5 g, 32.7 mmol) dissolved in anhydrous tetrahydrofuran (163 ml). The reaction solution was heated to room temperature and stirred for 20 minutes. The reaction was terminated by adding 1N aqueous hydrochloric acid (100 ml) to the reaction solution, followed by extraction with diethyl ether. The organic layer was concentrated under reduced pressure and purified by silica gel column (methanol:dichloromethane=1:9) to obtain the desired product (yield: 92%).

$^1$H-NMR (500 MHz, CHLOROFORM-D): δ7.20 (d, J=7.9 Hz, 2H), 7.14 (d, J=7.9 Hz, 2H), 3.64 (s, 2H), 2.83 (s, 2H), 1.63-1.40 (m, 9H), 1.18-1.06 (6H)

Step 2: Synthesis of tert-butyl 3-(4-(2-amino-2-oxoethyl)phenyl)-2,2-dimethylpropanoate 2-(4-(3-Tert-butoxy-2,2-dimethyl-3-oxopropyl)phenyl) acetic acid (6.82 g, 23.33 mmol) obtained in Step 1 was used in a similar manner to Step 3 of Preparation Example 6 to obtain the desired product (yield: 52.7%).

$^1$H-NMR (400 MHz, CHLOROFORM-D): δ7.20-7.09 (m, 4H), 5.33 (d, J=36.1 Hz, 2H), 3.54 (s, 2H), 2.80 (s, 2H), 1.42 (s, 9H), 1.11 (s, 6H)

Preparation Example 11: Synthesis of ethyl (R)-1-(2-aminopyrimidin-4-yl)piperidine-3-carboxylate

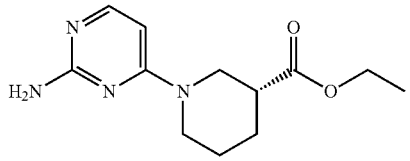 [SMILES: CCOC(=O)[C@@H]1CCCN(c2ccnc(N)n2)C1]

Step 1: Synthesis of ethyl (R)-1-(2-chloropyrimidin-4-yl)piperidine-3-carboxylate 2,4-Dichloropyrimidine (0.5 g, 3.36 mmol) was dissolved in ethanol (6.71 ml), and ethyl (R)-piperidine-3-carboxylate (0.621 ml, 4.03 mmol) and TEA (0.187 ml, 1.343 mmol) were added thereto. The reaction mixture was stirred at 85° C. for 3 hours. After removing the solvent under reduced pressure, the resultant product was dissolved in ethyl acetate and washed with water. The purification was carried out by silica gel column to obtain the desired product (yield: 86%).

$^1$H-NMR (500 MHz, CHLOROFORM-D): δ8.05 (d, J=6.1 Hz, 1H), 6.47 (d, J=6.4 Hz, 1H), 4.51-4.11 (m, 3H), 4.06 (s, 1H), 3.43 (dd, J=13.4, 9.5 Hz, 1H), 3.36-3.21 (m, 1H), 2.67-2.46 (m, 1H), 2.22-2.03 (m, 1H), 1.96-1.79 (m, 2H), 1.69-1.59 (m, 1H), 1.33-1.23 (m, 3H)

Step 2: Synthesis of ethyl (R)-1-(2-((tert-butoxycarbonyl)amino)pyrimidin-4-yl)piperidine-3-carboxylate After dissolving ethyl (R)-1-(2-chloropyrimidin-4-yl)piperidine-3-carboxylate (0.78 g, 2.89 mmol) obtained in Step 1, tert-butyl carbamate (0.407 g, 3.47 mmol), cesium carbonate (2.36 g, 7.23 mmol), 4,5-bis(diphenylphosphino)-9,9-dimethylxanthine (0.201 g, 0.347 mmol) and tris(dibenzylideneacetone)dipalladium(0) (0.265 g, 0.289 mmol) in 50 ml of 1,4-dioxane, dissolved oxygen was removed through nitrogen bubbling under stirring, and then the inflow of external air was blocked in an airtight container. The reaction mixture was stirred at 145° C. for 6 hours and then cooled to room temperature. After filtration through a Celite pad and removing the organic solvent under reduced pressure, the resultant product was dissolved in ethyl acetate and washed with brine. The organic solvent was dried over magnesium sulfate and removed under reduced pressure. The purification was carried out by silica gel column to obtain the desired product (yield: 11.8%).

m/z (M+H)+ calculated for C17H26N4O4: 350.42, found 351.2

Step 3: Synthesis of ethyl (R)-1-(2-aminopyrimidin-4-yl)piperidine-3-carboxylate After dissolving ethyl (R)-1-(2-((tert-butoxycarbonyl)amino)pyrimidin-4-yl)piperidine-3-carboxylate (0.120 g, 0.342 mmol) obtained in Step 2 in DCM (3 ml), trifluoroacetic acid (0.3 ml) dissolved in DCM was added thereto and stirred at room temperature for 2 hours. After removing the solvent under reduced pressure, the resultant product was dissolved in DCM and washed with water. The purification was carried out by silica gel column to obtain the desired product (yield: 58.3%).

$^1$H-NMR (500 MHz, CHLOROFORM-D): δ7.68 (d, J=6.7 Hz, 1H), 6.49-6.21 (1H), 6.07 (d, J=6.7 Hz, 1H), 4.31 (d, J=13.1 Hz, 1H), 4.16 (q, J=7.1 Hz, 2H), 4.01 (d, J=13.1 Hz, 1H), 3.43-3.30 (1H), 3.30-3.16 (1H), 2.63-2.47 (m, 1H), 2.19-2.03 (m, 1H), 1.91-1.76 (m, 2H), 1.65-1.46 (m, 1H), 1.26 (t, J=7.0 Hz, 3H)

Preparation Example 12: Synthesis of tert-butyl 3-(3-(6-aminopyridin-2-yl)phenyl)-2,2-dimethylpropanoate

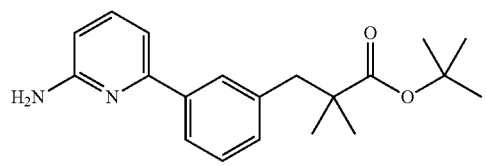 [SMILES: CC(C)(C)OC(=O)C(C)(C)Cc1cccc(-c2cccc(N)n2)c1]

Step 1: Synthesis of tert-butyl 3-(3-bromophenyl)-2,2-dimethylpropanoate

1-Bromo-3-(bromomethyl)benzene (20.0 g, 80 mmol) was used in a similar manner to Step 1 of Preparation 10 to obtain the desired product (yield 77%).

$^1$H-NMR (400 MHz, CHLOROFORM-D): δ7.37-7.30 (m, 2H), 7.16-7.04 (m, 2H), 2.78 (s, 2H), 1.44 (s, 9H), 1.13 (s, 6H)

Step 2: Synthesis of tert-butyl 2,2-dimethyl-3-(3-(4,4,5,5-tetramethyl-1,3,2-dioxaborolan-2-yl)phenyl-propanoate After dissolving tert-butyl 3-(3-bromophenyl)-2,2-dimethylpropanoate (19.3 g, 61.6 mmol) obtained in Step 1, 4,4,4,4,5,5,5,5-octamethyl-2,2-bi(1,3,2-dioxaborolane) (18.78 g, 73.9 mmol), potassium acetate (18.14 g, 185 mmol) and Pd(dppf)Cl$_2$·CH$_2$Cl$_2$ (2.52 g, 3.08 mmol)) in 616 ml of 1,4-dioxane, dissolved oxygen was removed through nitrogen bubbling under stirring, and then the inflow of external air was blocked in an airtight container. The reaction mixture was stirred at 110° C. for 16 hours and then cooled to room temperature. After filtration through a Celite pad and removal of the organic solvent under reduced pressure, the purification was carried out by silica gel column (ethyl acetate:hexane) to obtain the desired product (yield: 69.8%).

$^1$H-NMR (400 MHz, CHLOROFORM-D): δ7.72-7.55 (m, 2H), 7.26-7.17 (m, 2H), 2.83 (s, 2H), 1.45 (s, 9H), 1.33 (s, 12H), 1.13 (s, 6H)

Step 3: Synthesis of tert-butyl 3-(3-(6-aminopyridin-2-yl)-phenyl)-2,2-dimethylpropanoate After dissolving 6-chloropyridin-2-amine (5.53 g, 43 mmol), tert-butyl 2,2-dimethyl-3-(3-(4,4,5,5-tetramethyl-1,3,2-dioxaborolan-2-yl)phenyl-propanoate (15.5 g, 43 mmol) obtained in Step 2, 2 M aqueous sodium carbonate solution (64.5 ml, 129 mmol) and bis(triphenylphosphino)dichloropalladium (3.02 g, 4.30 mmol) in 358 ml of dimethoxyethane, dissolved oxygen was removed through nitrogen bubbling under stirring, and then the inflow of external air was blocked in an airtight container. The reaction mixture was stirred at 100° C. for 16 hours and cooled to room temperature. After filtration through a Celite pad and removing the organic solvent under reduced pressure, the resultant product was dissolved in ethyl acetate and washed with brine. The organic solvent was dried over magnesium sulfate and removed under reduced pressure. The purification was carried out by silica gel column (ethyl acetate:hexane) to obtain the desired product (yield: 41.6%).

m/z (M+H)+ calculated for C$_{20}$H$_{26}$N$_2$O$_2$: 326.44, found 327.2

Preparation Example 13: Synthesis of tert-butyl 2-(4-(3-amino-3-oxopropyl)phenoxy)-2-methylpropanoate

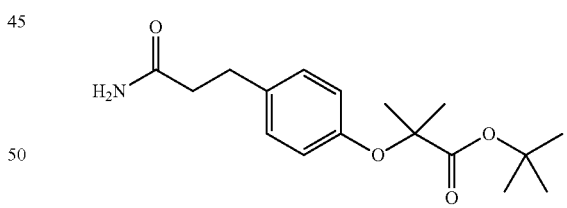

Step 1: Synthesis of tert-butyl 2-(4-(3-methoxy-3-oxopropyl)phenoxy)-2-methylpropanoate Methyl 3-(4-hydroxyphenyl)propanoate (2.17 g, 12.04 mmol), magnesium sulfate (0.29 g, 2.41 mmol) and potassium carbonate (6.66 g, 48.2 mmol) were dissolved in DMF (30.1 ml), and tert-butyl 2-bromo-2-methylpropanoate (9.40 g, 42.1 mmol) was further added thereto. The reaction mixture was stirred at 75° C. for 16 hours and then cooled to room temperature. After filtration through a Celite pad and removing the organic solvent under reduced pressure, the resultant product was dissolved in ethyl acetate and washed with brine. The organic solvent was dried over magnesium sulfate and removed under reduced pressure. The purification was carried out by silica gel column (ethyl acetate:hexane) to obtain the desired product (yield: 62%).

Step 2: Synthesis of 3-(4-((1-(tert-butoxy)-2-methyl-1-oxopropan-2-yl)oxy)phenyl)propanoic acid After dissolving tert-butyl 2-(4-(3-methoxy-3-oxopropyl) phenoxy)-2-methylpropanoate (2.4 g, 7.44 mmol) in THF (15 ml) and methanol (15 ml), 1 N sodium hydroxide (15 ml) was further added thereto and stirred at room temperature for 6 hours. The reaction mixture was acidified with an aqueous hydrochloric acid solution, extracted with ethyl acetate and washed with brine. The organic solvent was dried over magnesium sulfate and removed under reduced pressure (yield: 100%).

Step 3: Synthesis of tert-butyl 2-(4-(3-amino-3-oxopropyl)phenoxy)-2-methylpropanoate 3-(4-((1-(Tert-butoxy)-2-methyl-1-oxopropan-2-yl)oxy) phenyl)propanoic acid (2.30 g, 7.46 mmol) was dissolved in DCM (37 ml), and oxalyl chloride (1.31 ml, 14.92 mmol) and DMF (0.058 ml, 0.75 mmol) were further added thereto at room temperature. The reaction mixture was stirred at room temperature for 30 minutes, the solvent was removed under reduced pressure, and then THF (19 ml) was added. The temperature was lowered to 0° C., and 25% ammonium hydroxide (8.71 mL, 224 mmol) was slowly added dropwise. After removing the organic solvent under reduced pressure, the reaction mixture was extracted by adding ethyl acetate and washed with brine. The organic solvent was dried over magnesium sulfate and removed under reduced pressure to obtain the desired product (yield: 87%).

$^1$H-NMR (400 MHz, CHLOROFORM-D): δ7.11-7.01 (m, 2H), 6.77 (dt, J=9.3, 2.5 Hz, 2H), 5.33 (s, 2H), 2.89 (t, J=7.5 Hz, 2H), 2.53-2.44 (m, 2H), 1.53 (s, 6H), 1.43 (s, 9H)

Preparation Example 14: Synthesis of benzyl 2-(4-(3-amino-3-oxopropyl)phenyl)-2-methylpropanoate

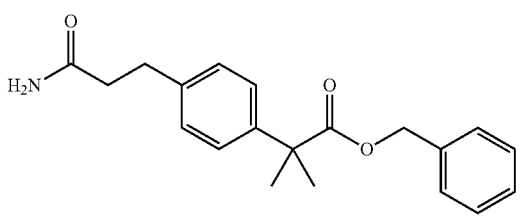 [SMILES: CC(C)(C(=O)OCc1ccccc1)c1ccc(CCC(N)=O)cc1]

By using 2-(4-bromophenyl)-2-methylpropanoic acid (5.00 g, 20.57 mmol) and benzyl bromide (4.22 g, 24.68 mmol), methods similar to Step 1 of Preparation Example 13, and Steps 1, 3 and 4 of Preparation Example 7 were carried out sequentially to obtain the desired product (yield: 60%).

$^1$H-NMR (400 MHz, CHLOROFORM-D): δ7.66-7.59 (m, 1H), 7.54-7.40 (m, 2H), 7.40-7.25 (m, 5H), 7.19-7.10 (m, 2H), 6.47-6.40 (m, 1H), 5.61 (s, 2H), 5.09 (s, 2H), 1.59 (s, 6H)

Preparation Example 15: Synthesis of tert-butyl 3-(4-(1-amino-2-methyl-1-oxopropan-2-yl)phenyl)-2,2-dimethylpropanoate

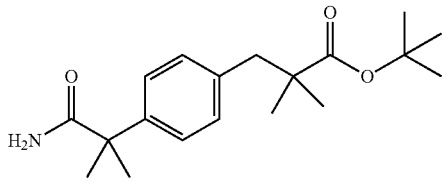 [SMILES: CC(C)(C)OC(=O)C(C)(C)Cc1ccc(C(C)(C)C(N)=O)cc1]

Step 1: Synthesis of tert-butyl 3-(4-(1-methoxy-2-methyl-1-oxopropan-2-yl)phenyl)-2,2-dimethylpropanoate Methyl 2-(4-(bromomethyl)phenyl)-2-methylpropanoate (5.40 g, 19.91 mmol) and tert-butyl isobutyrate (3.45 g, 23.90 mmol) were used in a similar manner to Step 1 of Preparation Example 10 to obtain the desired product (yield: 78%).

$^1$H-NMR (400 MHz, CHLOROFORM-D): δ7.20 (d, J=8.2 Hz, 2H), 7.09 (d, J=8.2 Hz, 2H), 3.63 (s, 3H), 2.78 (s, 2H), 1.54 (s, 6H), 1.41 (s, 9H), 1.11 (s, 6H)

Step 2: Synthesis of tert-butyl 3-(4-(1-amino-2-methyl-1-oxopropan-2-yl)phenyl)-2,2-dimethylpropanoate By using tert-butyl 3-(4-(1-methoxy-2-methyl-1-oxopropan-2-yl)phenyl)-2,2-dimethylpropanoate (0.50 g, 1.50 mmol) obtained in Step 1, methods similar to Steps 2 and 3 of Preparation Example 13 were carried out sequentially to obtain the desired product (yield: 76%).

$^1$H-NMR (400 MHz, CHLOROFORM-D): δ7.25 (d, J=8.2 Hz, 2H), 7.11 (d, J=8.2 Hz, 2H), 5.85 (s, 1H), 5.31 (s, 1H), 2.78 (s, 2H), 1.53 (s, 6H), 1.41 (s, 9H), 1.10 (s, 6H)

Preparation Example 16: Synthesis of tert-butyl 2-(4-(2-amino-2-oxoethyl)phenoxy)-2-methylpropanoate

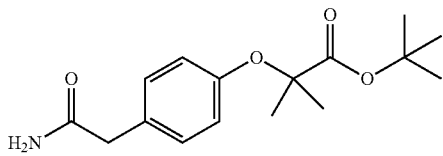 [SMILES: CC(C)(C)OC(=O)C(C)(C)Oc1ccc(CC(N)=O)cc1]

Methyl 2-(4-hydroxyphenyl) acetate (2.00 g, 12.04 mmol) and tert-butyl 2-bromo-2-methylpropanoate (9.40 g, 42.1 mmol) were used in a similar manner to Preparation Example 13 to obtain the desired product (yield: 54%).

$^1$H-NMR (400 MHz, CHLOROFORM-D): δ7.12 (dd, J=11.4, 2.7 Hz, 2H), 6.83 (td, J=5.7, 3.7 Hz, 2H), 5.43 (d, J=26.5 Hz, 2H), 3.50 (s, 2H), 1.57-1.50 (m, 6H), 1.45-1.37 (m, 9H)

Preparation Example 17: Synthesis of ethyl 2-(4-(2-aminopyrimidin-4-yl)phenyl)acetate

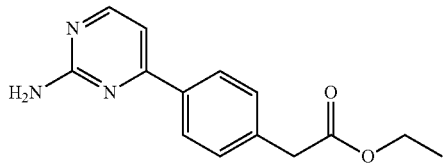 [SMILES: CCOC(=O)Cc1ccc(-c2ccnc(N)n2)cc1]

Ethyl 2-(4-bromophenyl)acetate (27.6 g, 114 mmol) was used in a similar manner to Steps 2 and 3 of Preparation Example 12, and Steps 2 and 3 of Preparation Example 11 to obtain the desired product (yield: 17.2%).

m/z (M+H)$^+$ calculated for $C_{14}H_{15}N_3O_2$: 257.29, found 258.1

Preparation Example 18: Synthesis of methyl (1r,4r)-4-((2-aminopyrimidin-4-yl)oxy)cyclohexane-1-carboxylate

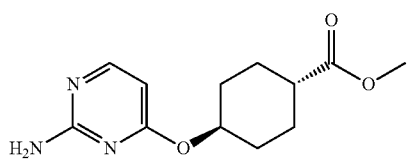 [SMILES: COC(=O)[C@H]1CC[C@H](Oc2ccnc(N)n2)CC1]

Step 1: Synthesis of methyl (1r,4r)-4-hydroxycyclohexane-1-carboxylate

After dissolving (1r,4r)-4-hydroxycyclohexane-1-carboxylic acid (0.300 g, 2.081 mmol) in methanol (10 ml), sulfuric acid (0.017 ml, 0.312 mmol) was added thereto. After stirring at 60° C. for 16 hours, the organic solvent was removed under reduced pressure, and the purification was carried out by silica gel column to obtain the desired product (yield: 100%).

$^1$H-NMR (400 MHz, CHLOROFORM-D): δ8.25 (d, J=5.9 Hz, 1H), 6.64-6.50 (m, 1H), 5.16-5.05 (1H), 3.73-3.62 (m, 3H), 2.35 (tt, J=11.4, 3.7 Hz, 1H), 2.18 (dt, J=12.8, 3.5 Hz, 2H), 2.07 (dd, J=14.2, 3.7 Hz, 2H), 1.74-1.56 (m, 2H), 1.49 (ddd, J=23.0, 12.7, 3.5 Hz, 2H)

Step 2: Synthesis of methyl (1r,4r)-4-((2-chloropyrimidin-4-yl)oxy)cyclohexane-1-carboxylate After dissolving 2,4-dichloropyrimidine (0.28 g, 1.91 mmol) in DMF (10 ml), methyl (1r,4r)-4-hydroxycyclohexane-1-carboxylate (0.33 g, 2.10 mmol) obtained in Step 1 and cesium carbonate (2.56 g, 4.78 mmol) were added thereto. After stirring at 80° C. for 3 hours, the reaction mixture was diluted with diethyl ether and washed with water. The organic solvent was dried over magnesium sulfate, and the purification was carried out by a silica gel column to obtain the desired product (yield: 39.8%).

$^1$H-NMR (400 MHz, CHLOROFORM-D): δ8.25 (d, J=5.9 Hz, 1H), 6.64-6.50 (m, 1H), 5.16-5.05 (1H), 3.73-3.62 (m, 3H), 2.35 (tt, J=11.4, 3.7 Hz, 1H), 2.18 (dt, J=12.8, 3.5 Hz, 2H), 2.07 (dd, J=14.2, 3.7 Hz, 2H), 1.74-1.56 (m, 2H), 1.49 (ddd, J=23.0, 12.7, 3.5 Hz, 2H)

Step 3: Synthesis of methyl (1r,4r)-4-((2-aminopyrimidin-4-yl)oxy)cyclohexane-1-carboxylate Methyl (1r,4r)-4-((2-chloropyrimidin-4-yl)oxy)cyclohexane-1-carboxylate (0.21 g, 0.76 mmol) obtained in Step 2 was used in a similar manner to Step 2 of Preparation Example 11 to obtain the desired product (yield: 69%).

$^1$H-NMR (400 MHz, CHLOROFORM-D) δ7.98 (d, J=5.9 Hz, 1H), 6.01 (d, J=5.5 Hz, 1H), 5.02-4.89 (m, 1H), 4.82 (s, 2H), 3.68 (dd, J=7.3, 2.7 Hz, 5H), 2.44-2.26 (m, 1H), 2.20-1.99 (m, 4H), 1.71-1.57 (m, 2H), 1.52 (s, 1H), 1.41 (dd, J=12.6, 3.4 Hz, 1H)

Example 1: Synthesis of N-(6-(5-(2-ethoxyphenoxy)pyridin-3-yl)pyrazin-2-yl)-3-phenylpropanamide

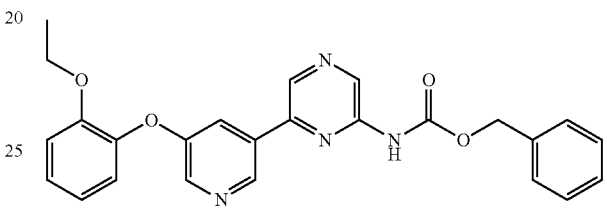

After dissolving 2-chloro-6-(5-(2-ethoxyphenoxy)pyridin-3-yl)pyrazine (0.1 g, 0.305 mmol) obtained in Preparation Example 1, 3-phenylpropanamide obtained in Preparation Example 5 (0.055 g, 0.366 mmol), cesium carbonate (0.249 g, 0.763 mmol), 4,5-bis(diphenylphosphino)-9,9-dimethylxanthine (21 mg, 0.037 mmol) and tris(dibenzylideneacetone)dipalladium(0) (28 mg, 0.031 mmol) in 15 ml of 1,4-dioxane, dissolved oxygen was removed through nitrogen bubbling under stirring, and then the inflow of external air was blocked in an airtight container. The reaction mixture was stirred at 110° C. for 16 hours and then cooled to room temperature. After filtering through a Celite pad and removing the organic solvent under reduced pressure, the resultant product was dissolved in ethyl acetate and washed with brine. The organic solvent was dried over magnesium sulfate and removed under reduced pressure. The purification was carried out by silica gel column (ethyl acetate:hexane=1:2) to obtain the desired product (yield: 67%).

m/z (M+H)$^+$ calculated for $C_{26}H_{24}N_4O_3$: 440.50, found 441.1

Example 2: Synthesis of methyl 2-(4-(2-((6-(5-(2-ethoxyphenoxy)pyridin-3-yl)pyrazin-2-yl)amino)-2-oxoethyl)phenyl)acetate

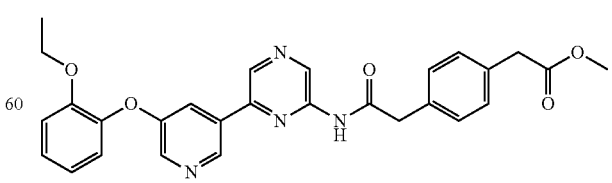

2-Chloro-6-(5-(2-ethoxyphenoxy)pyridin-3-yl)pyrazine (0.32 g, 0.976 mmol) obtained in Preparation Example 1 and methyl 2-(4-(2-amino-2-oxoethyl)phenyl)acetate (0.243 g, 1.172 mmol) obtained in Preparation Example 6 were used in a similar manner to Example 1 to obtain the desired product (yield: 22.6%).

$^1$H NMR (500 MHz, CHLOROFORM-D): δ9.50 (s, 1H), 8.86 (s, 1H), 8.67 (s, 1H), 8.61 (s, 1H), 8.33 (s, 1H), 7.67 (d, J=1.8 Hz, 1H), 7.27 (4H), 7.17 (1H), 7.08 (d, J=7.3 Hz, 1H), 7.00-6.94 (m, 2H), 3.99 (q, J=6.7 Hz, 2H), 3.76 (s, 2H), 3.67 (s, 3H), 3.62 (s, 2H), 1.19 (t, J=6.7 Hz, 3H)

Example 3: Synthesis of 2-(4-(2-((6-(5-(2-ethoxyphenoxy)pyridin-3-yl)pyrazin-2-yl)amino)-2-oxoethyl)phenyl)acetic acid

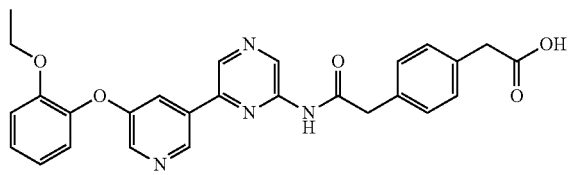 [SMILES: CCOc1ccccc1Oc1cncc(-c2cncc(NC(=O)Cc3ccc(CC(=O)O)cc3)n2)c1]

Methyl 2-(4-(2-((6-(5-(2-ethoxyphenoxy)pyridin-3-yl)pyrazin-2-yl)amino)-2-oxoethyl)phenyl)acetate (110 mg, 0.221 mmol) obtained in Example 2 was dissolved in THF (6 ml) and methanol (2 ml). Sodium hydroxide (44 mg, 1.103 mmol) dissolved in water (2 ml) was added thereto, followed by stirring at room temperature for 4 hours. After cooling the reaction to room temperature, the reaction mixture was titrated to pH 4.5 by the use of 1 N aqueous hydrochloric acid solution, diluted with ethyl acetate, and the water layer was removed. The resultant product was dried over magnesium sulfate, and the organic solvent was removed under reduced pressure. The purification was carried out by silica gel column (ethyl acetate:hexane=1:1) to obtain the desired product (yield: 33.6%).

m/z (M+H)$^+$ calculated for $C_{27}H_{24}N_4O_5$: 484.51, found 485.1

Example 4: Synthesis of 2-(4-(3-((6-(5-(2-ethoxyphenoxy)pyridin-3-yl)pyrazin-2-yl)amino)-3-oxopropyl)phenyl)acetic acid

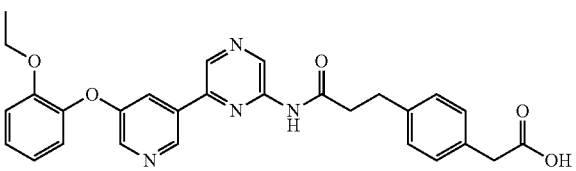

Step 1: Synthesis of methyl 2-(4-(3-((6-(5-(2-ethoxyphenoxy)pyridin-3-yl)amino)-3-oxopropyl)phenyl)acetate 2-Chloro-6-(5-(2-ethoxyphenoxy)pyridin-3-yl)pyrazine (0.20 g, 0.61 mmol) obtained in Preparation Example 1 and methyl 2-(4-(3-amino-3-oxopropyl)phenyl)acetate (0.14 g, 0.61 mmol) obtained in Preparation Example 7 were used in a similar manner to Example 1 to obtain the desired product (yield: 35%).

$^1$H-NMR (400 MHz, CHLOROFORM-D): δ9.51 (s, 1H), 8.87 (s, 1H), 8.70 (s, 1H), 8.36 (d, J=10 Hz, 2H), 7.68 (s, 1H), 7.25 (m, 5H), 7.10 (d, 1H), 6.94~7.02 (m, 2H), 4.02 (q, 2H), 3.66 (s, 3H), 3.58 (s, 2H), 3.06 (t, 2H), 2.77 (t, 2H), 1.21 (t, 3H)

Step 2: Synthesis of 2-(4-(3-((6-(5-(2-ethoxyphenoxy)pyridin-3-yl)pyrazin-2-yl)amino)-3-oxopropyl)phenyl)acetic acid The ester compound (0.11 g, 2.39 mmol) obtained in Step 1 was hydrolyzed in a similar manner to Example 3 to obtain the desired product (yield: 28%).

$^1$H-NMR (400 MHz, DMSO-D6): δ10.87 (s, 1H), 9.34 (s, 1H), 9.00 (s, 2H), 8.33 (s, 1H), 7.89 (s, 1H), 7.17 (m, 7H), 7.02 (t, 1H), 4.03 (t, 2H), 3.51 (s, 2H), 2.92 (t, 2H), 2.78 (t, 2H), 1.10 (t, 3H)

Example 5: Synthesis of methyl 2-(4-(3-((6-(5-(2-ethoxyphenoxy)pyridin-3-yl)pyrazin-2-yl)amino)-3-oxopropyl)phenyl)-2-methylpropanoate

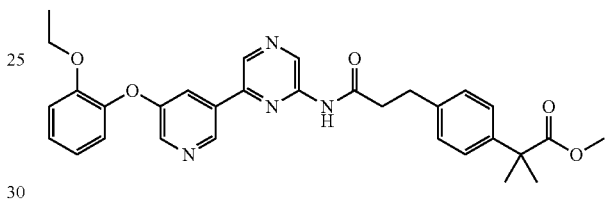

2-Chloro-6-(5-(2-ethoxyphenoxy)pyridin-3-yl)pyrazine (0.25 g, 0.76 mmol) obtained in Preparation Example 1 and methyl 2-(4-(3-amino-3-oxopropyl)phenyl-2-methylpropanoate (0.19 g, 0.76 mmol) obtained in Preparation Example 8 were used in a similar manner to Example 1 to obtain the desired product (yield: 51%).

$^1$H NMR (400 MHz, CHLOROFORM-D): δ9.51 (s, 1H), 8.86 (s, 1H), 8.72 (s, 1H), 8.37 (d, J=4 Hz, 1H), 7.99 (s, 1H), 7.70 (s, 1H), 7.25 (m, 3H), 7.20 (m, 2H), 7.12 (m, 1H), 7.03 (m, 2H), 4.03 (q, 2H), 3.06 (t, 2H), 2.78 (t, 2H), 1.55 (s, 6H), 1.22 (t, 3H)

Example 6: Synthesis of ethyl 2-(4-(2-((6-(5-(2-ethoxyphenoxy)pyridin-3-yl)pyrazin-2-yl)amino)-2-oxoethyl)phenyl)-2,2-difluoroacetate

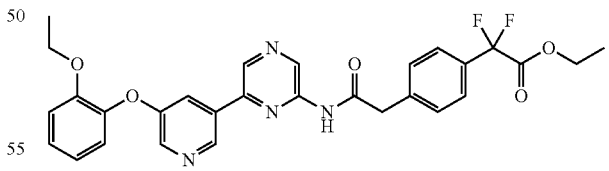

Step 1: Synthesis of 6-(5-(2-ethoxyphenoxy)pyridin-3-yl)pyrazin-2-amine

The title compound was obtained as a by-product in the preparation process of 2-(4-(2-((6-(5-(2-ethoxyphenoxy)pyridin-3-yl)pyrazin-2-yl)amino)-2-oxoethyl)phenyl)acetic acid in Example 3.

m/z (M+H)$^+$ calculated for $C_{17}H_{16}N_4O_2$: 308.3, found 309.1

Step 2: Synthesis of ethyl 2-(4-(2-((6-(5-(2-ethoxyphenoxy)pyridin-3-yl)pyrazin-2-yl)amino)-2-oxoethyl)phenyl)-2,2-difluoroacetate After dissolving 2-(4-(2-ethoxy-1,1-difluoro-2-oxoethyl)phenyl)acetic acid (0.02 g, 0.077 mmol) obtained in Preparation Example 9 in DCM (0.4 ml), oxalyl chloride (0.02 g, 0.155 mmol) was added, and 1 drop of DMF was added. The reaction mixture was stirred at room temperature for 1 hour, and the solvent was removed under reduced pressure. After dissolving the concentrate in THF (0.2 ml), the temperature was lowered to 0° C., 6-(5-(2-ethoxyphenoxy)pyridin-3-yl)pyrazin-2-amine obtained in Step 1 (0.02 g, 0.065 mmol) was dissolved in THF (0.2 ml), and TEA (0.022 g, 0.216 mmol) was added thereto. After stirring at room temperature for 16 hours, water was added, and the reaction mixture was extracted with ethyl acetate. After washing with water and brine, the organic layer was dried over magnesium sulfate and concentrated under reduced pressure. The purification was carried out by column chromatography to obtain the desired product (yield: 13%).

¹H-NMR (500 MHz, CHLOROFORM-D): δ9.49 (s, 1H), 8.84 (s, 1H), 8.74 (s, 1H), 8.38 (s, 1H), 7.91 (s, 1H), 7.67 (s, 1H), 7.66 (d, J=7.9 Hz, 2H), 7.46 (d, J=7.9 Hz, 2H), 7.21 (1H), 7.11 (1H), 7.03-6.99 (2H), 4.30 (q, J=7.95 Hz, 2H), 4.03 (q, J=6.15 Hz, 2H), 3.86 (s, 2H), 1.31 (t, J=6.15 Hz, 3H), 1.22 (t, J=7.95 Hz, 3H)

Example 7: Synthesis of 3-(4-(2-((6-(5-(2-ethoxyphenoxy)pyridin-3-yl)pyrazin-2-yl)amino)-2-oxoethyl)phenyl)-2,2-dimethylpropanoic acid

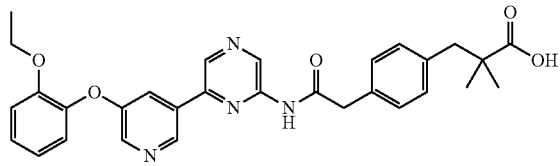 [SMILES: CCOc1ccccc1Oc1cncc(-c2cncc(NC(=O)Cc3ccc(CC(C)(C)C(=O)O)cc3)n2)c1]

2-Chloro-6-(5-(2-ethoxyphenoxy)pyridin-3-yl)pyrazine (0.1 g, 0.305 mmol) obtained in Preparation Example 1 and tert-butyl 3-(4-(2-amino-2-oxoethyl)phenyl)-2,2-dimethylpropanoate (0.081 g, 0.277 mmol) obtained in Preparation Example 10 were used in a similar manner to Example 1 and Step 3 of Preparation Example 11 to obtain the desired product (yield: 12%).

¹H-NMR (400 MHz, METHANOL-D4): δ9.34 (s, 1H), 8.89 (s, 1H), 8.85-8.74 (m, 1H), 8.23 (d, J=2.7 Hz, 1H), 7.91 (q, J=1.4 Hz, 1H), 7.33-7.19 (m, 3H), 7.19-7.06 (m, 4H), 7.01 (t, J=7.5 Hz, 1H), 3.99 (q, J=7.0 Hz, 2H), 3.72 (s, 2H), 2.82 (s, 2H), 1.18-1.01 (m, 9H)

Example 8: Synthesis of (R)-1-(2-((6-(5-(2-ethoxyphenoxy)pyridin-3-yl)pyrazin-2-yl)amino)pyrimidin-4-yl)piperidine-3-carboxylic acid

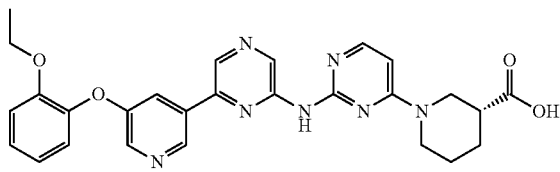 [SMILES: CCOc1ccccc1Oc1cncc(-c2cncc(Nc3nccc(N4CCC[C@@H](C(=O)O)C4)n3)n2)c1]

2-Chloro-6-(5-(2-ethoxyphenoxy)pyridin-3-yl)pyrazine (0.1 g, 0.305 mmol) obtained in Preparation Example 1 and ethyl (R)-1-(2-aminopyrimidin-4-yl)piperidine-3-carboxylate (0.069 g, 0.277 mmol) obtained in Preparation Example 11 were used in a similar manner to Example 1 and Example 3 to obtain the desired product (yield: 49%).

¹H-NMR (400 MHz, METHANOL-D4): δ9.45 (s, 1H), 8.88 (d, J=1.8 Hz, 1H), 8.64 (s, 1H), 8.21 (d, J=2.7 Hz, 1H), 7.96 (d, J=6.4 Hz, 1H), 7.92 (t, J=2.3 Hz, 1H), 7.31-7.21 (m, 1H), 7.21-7.16 (1H), 7.16-7.09 (m, 1H), 7.06-6.95 (m, 1H), 6.42 (d, J=6.4 Hz, 1H), 4.50-4.06 (1H), 4.01 (q, J=7.0 Hz, 2H), 3.53-3.33 (m, 1H), 3.23 (s, 1H), 2.62-2.40 (1H), 2.19-2.01 (1H), 1.81 (d, J=12.3 Hz, 2H), 1.68-1.44 (1H), 1.14 (t, J=6.9 Hz, 3H)

Example 9: Synthesis of 3-(3-(6-((6-(5-(2-ethoxyphenoxy)pyridin-3-yl)pyrazin-2-yl)amino)pyridin-2-yl)phenyl)-2,2-dimethylpropanoic acid

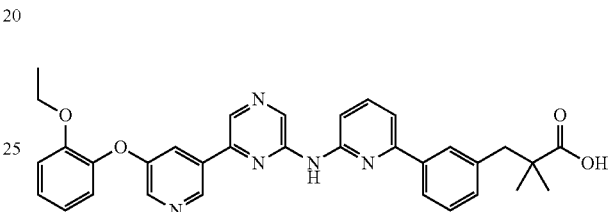

2-Chloro-6-(5-(2-ethoxyphenoxy)pyridin-3-yl)pyrazine (0.1 g, 0.305 mmol) obtained in Preparation Example 1 and tert-butyl 3-(4-(2-amino-2-oxoethyl)phenyl)-2,2-dimethylpropanoate (0.091 g, 0.277 mmol) obtained in Preparation Example 10 were used in a similar manner to Example 1 and Step 3 of Preparation Example 11 to obtain the desired product (yield: 26.9%).

¹H-NMR (400 MHz, METHANOL-D4): δ9.36 (s, 1H), 8.89 (d, J=1.8 Hz, 1H), 8.65-8.50 (1H), 8.25 (d, J=2.7 Hz, 1H), 7.99-7.88 (m, 2H), 7.84 (d, J=7.8 Hz, 1H), 7.65 (t, J=7.8 Hz, 1H), 7.40 (d, J=7.3 Hz, 1H), 7.34 (dd, J=8.0, 5.7 Hz, 2H), 7.30-7.24 (m, 1H), 7.20 (dd, J=8.0, 1.6 Hz, 2H), 7.15 (d, J=8.2 Hz, 1H), 7.11-6.95 (m, 1H), 4.04-3.91 (2H), 2.95 (s, 2H), 1.19 (s, 6H), 1.13 (t, J=7.1 Hz, 3H)

Example 10: Synthesis of N-(6-(3-(2-ethoxyphenoxy)phenyl)pyrazin-2-yl)-3-phenylpropanamide

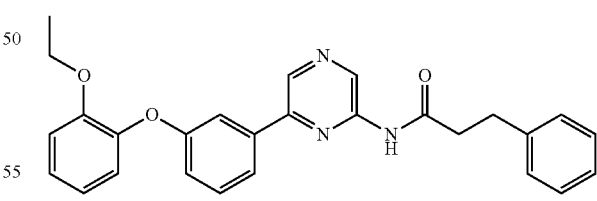

2-Chloro-6-(3-(2-ethoxyphenoxy)phenyl)pyrazine (0.1 g, 0.306 mmol) obtained in Preparation Example 2 and 3-phenylpropanamide obtained in Preparation Example 5 (0.055 g, 0.367 mmol) were used in a similar manner to Example 1 to obtain the desired product (yield: 60%).

¹H NMR (500 MHz, CHLOROFORM-D): δ9.44 (s, 1H), 8.70 (s, 1H), 8.00 (s, 1H), 7.57 (1H), 7.50 (s, 1H), 7.36 (1H), 7.28-7.25 (2H), 7.21-7.19 (3H), 7.10 (1H), 7.05-6.98 (3H), 6.90 (1H), 4.30 (q, J=7.3 Hz, 2H), 3.04 (t, J=7.65 Hz, 2H), 2.69 (t, J=7.95 Hz, 2H), 1.23 (3H)

Example 11: Synthesis of 2-(4-(2-((6-(3-(2-ethoxyphenoxy)phenyl)pyrazin-2-yl)amino)-2-oxoethyl)phenyl)acetic acid

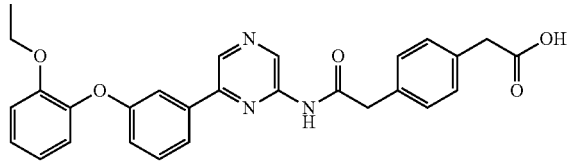 [SMILES: CCOc1ccccc1Oc1cccc(-c2cncc(NC(=O)Cc3ccc(CC(=O)O)cc3)n2)c1]

2-chloro-6-(3-(2-ethoxyphenoxy)phenyl)pyrazine (0.250 g, 0.765 mmol) obtained in Preparation Example 2 and methyl 2-(4-(2-amino-2-oxoethyl)phenyl) acetate (0.190 g, 0.918 mmol) obtained in Preparation Example 6 were used in a similar manner to Example 1 and Example 3 sequentially to obtain the desired product (yield: 34.1%).

$^1$H NMR (300 MHz, Methanol-D): δ9.35 (s, 1H), 8.61 (s, 1H), 8.52 (s, 1H), 7.45 (1H), 7.40 (d, J=1.25 Hz, 1H), 7.26 (1H), 7.13 (m, 4H), 7.02 (1H), 6.94-6.89 (3H), 6.81 (1H), 3.95 (2H), 3.59 (s, 2H), 3.39 (s, 2H), 1.18 (3H)

Example 12: Synthesis of 2-(4-(3-((6-(3-(2-ethoxyphenoxy)phenyl)pyrazin-2-yl)amino)-3-oxopropyl)phenyl)acetic acid

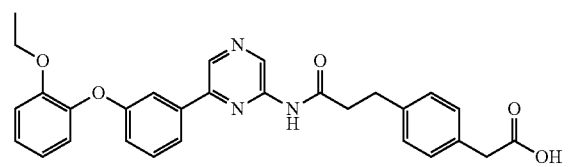 [SMILES: CCOc1ccccc1Oc1cccc(-c2cncc(NC(=O)CCc3ccc(CC(=O)O)cc3)n2)c1]

Step 1: Synthesis of methyl 2-(4-(3-((6-(3-(2-ethoxyphenoxy)phenyl)pyrazin-2-yl)amino)-3-oxopropyl)phenyl)acetate 2-Chloro-6-(3-(2-ethoxyphenoxy)phenyl)pyrazine (0.10 g, 0.31 mmol) obtained in Preparation Example 4 and methyl 2-(4-(3-amino-3-oxopropyl)phenyl)acetate (0.07 g, 0.31 mmol) obtained in Preparation Example 11 were used in a similar manner to Example 1 to obtain the desired product (yield: 75%).

$^1$H-NMR (400 MHz, CHLOROFORM-D): δ9.45 (s, 1H), 8.71 (s, 1H), 8.11 (s, 1H), 7.51 (d, J=12 Hz, 1H), 7.51 (s, 1H), 7.36 (t, 1H), 7.16 (d, J=8 Hz, 2H), 7.14 (d, J=8 Hz, 2H), 7.09 (t, 1H), 6.90~6.98 (m, 3H), 6.89 (t, 1H), 4.06 (t, 2H), 3.67 (s, 3H), 3.59 9s, 2H), 3.01 (t, 2H), 2.65 (t, 2H), 1.24 (t, 3H)

Step 2: Synthesis of 2-(4-(3-((6-(3-(2-ethoxyphenoxy)phenyl)pyrazin-2-yl)amino)-3-oxopropyl)phenyl)acetic acid The ester compound (0.11 g, 2.39 mmol) obtained in Step 1 was hydrolyzed in a similar manner to Example 3 to obtain the desired product (yield: 69%).

$^1$H-NMR (400 MHz, CHLOROFORM-D): δ9.49 (s, 1H), 8.91 (s, 1H), 8.67 (s, 1H), 7.47 (d, 1H), 7.43 (s, 1H), 7.35 9t, 1H), 7.11~7.26 (m, 5H), 6.97~7.05 (m, 3H), 6.91 (t, 1H), 4.06 (t, 2H), 3.61 (s, 2H), 3.00 (t, 2H), 2.68 (t, 2H), 1.26 (t, 3H)

Example 13: Synthesis of 2-(4-(3-((6-(3-(2-ethoxyphenoxy)phenyl)pyrazin-2-yl)amino)-3-oxopropyl)phenoxy)-2-methylpropanoic acid

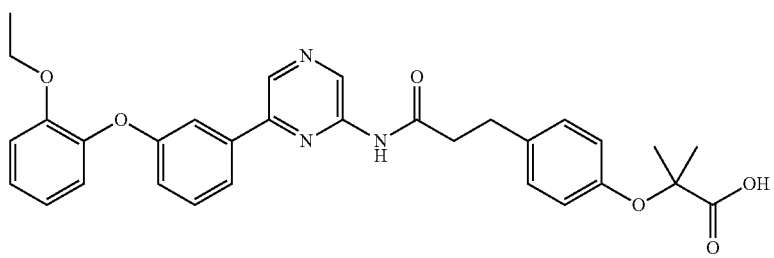 [SMILES: CCOc1ccccc1Oc1cccc(-c2cncc(NC(=O)CCc3ccc(OC(C)(C)C(=O)O)cc3)n2)c1]

2-Chloro-6-(3-(2-ethoxyphenoxy)phenyl)pyrazine (0.080 g, 0.245 mmol) obtained in Preparation Example 2 and tert-butyl 2-(4-(3-amino-3-oxopropyl)phenoxy)-2-methylpropanoate (0.075 g, 0.245 mmol) obtained in Preparation Example 13 were used in a similar manner to Example 1 and Step 3 of Preparation Example 11 to obtain the desired product (yield: 64%).

$^1$H-NMR (400 MHz, CHLOROFORM-D): δ9.43 (s, 1H), 8.65-8.52 (m, 2H), 7.51-7.41 (m, 2H), 7.36-7.27 (m, 1H), 7.10-6.91 (m, 6H), 6.91-6.76 (m, 3H), 4.01 (q, J=6.9 Hz, 2H), 2.93 (t, J=6.9 Hz, 2H), 2.63 (d, J=5.0 Hz, 2H), 1.56 (s, 6H), 1.23 (t, J=7.1 Hz, 3H)

Example 14: Synthesis of 2-(4-(2-((6-(3-(2-ethoxyphenoxy)phenyl)pyrazin-2-yl)amino)-2-oxoethyl)phenyl-2,2-difluoroacetic acid

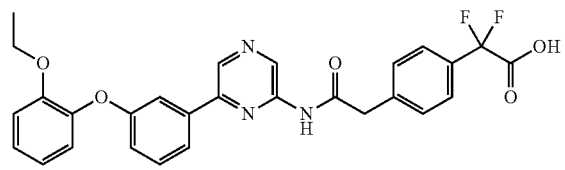 [SMILES: CCOc1ccccc1Oc1cccc(-c2cncc(NC(=O)Cc3ccc(C(F)(F)C(=O)O)cc3)n2)c1]

Step 1: Synthesis of
6-(3-(2-ethoxyphenoxy)phenyl)pyrazin-2-amine

The title compound was obtained as a by-product in the preparation process of 2-(4-(2-((6-(3-(2-ethoxyphenoxy)phenyl)pyrazin-2-yl)amino)-2-oxoethyl)phenyl)acetic acid in Example 11.

m/z (M+H)$^+$ calculated for $C_{18}H_{17}N_3O_2$: 307.3, found 308.1

Step 2: Synthesis of 2-(4-(2-((6-(3-(2-ethoxyphenoxy)phenyl)pyrazin-2-yl)amino)-2-oxoethyl)phenyl-2,2-difluoroacetic acid 2-(4-(2-Ethoxy-1,1-difluoro-2-oxoethyl)phenyl)acetic acid (0.046 g, 0.178 mmol) obtained in Preparation Example 9 and 6-(3-(2-ethoxyphenoxy)phenyl)pyrazin-2-amine (0.061 g, 0.199 mmol) obtained in Step 1 were used in a similar manner to Example 6 and Example 3 sequentially to obtain the desired product (yield: 5.7%).

$^1$H-NMR (500 MHz, METHANOL-D4): δ9.19 (s, 1H), 8.66 (s, 1H), 7.65 (1H), 7.54-7.52 (3H), 7.35-7.33 (3H), 7.10 (1H), 7.04-6.98 (2H), 6.90-6.88 (2H), 3.94 (q, J=7.3 Hz, 2H), 3.74 (s, 1H), 1.10 (t, J-6.7 Hz, 3H)

Example 15: Synthesis of 3-(4-(2-((6-(3-(2-ethoxyphenoxy)phenyl)pyrazin-2-yl)amino)-2-oxoethyl)phenyl)-2,2-dimethylpropanoic acid

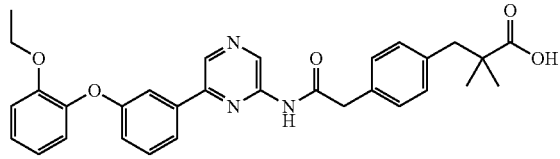 [SMILES: CCOc1ccccc1Oc1cccc(-c2cncc(NC(=O)Cc3ccc(CC(C)(C)C(=O)O)cc3)n2)c1]

2-Chloro-6-(3-(2-ethoxyphenoxy)phenyl)pyrazine (0.10 g, 0.306 mmol) obtained in Preparation Example 2 and tert-butyl 3-(4-(2-amino-2-oxoethyl)phenyl)-2,2-dimethylpropanoate (0.089 g, 0.306 mmol) obtained in Preparation Example 10 were used in a similar manner to Example 1 and Step 3 of Preparation Example 11 to obtain the desired product (yield: 74%).

$^1$H NMR (400 MHz, CHLOROFORM-D): δ9.43 (s, 1H), 8.68 (s, 1H), 8.19 (s, 1H), 7.56-7.47 (m, 2H), 7.34 (t, J=8.0 Hz, 1H), 7.18 (td, J=7.8, 5.6 Hz, 4H), 7.13-7.05 (m, 1H), 7.05-6.93 (m, 3H), 6.90 (t, J=7.8 Hz, 1H), 4.03 (q, J=7.0 Hz, 2H), 3.76-3.69 (m, 2H), 2.88 (s, 2H), 1.29-1.16 (m, 9H)

Example 16: Synthesis of 2-(4-(3-((6-(3-(2-ethoxyphenoxy)phenyl)pyrazin-2-yl)amino)-3-oxopropyl)phenyl)-2-methylpropanoic acid

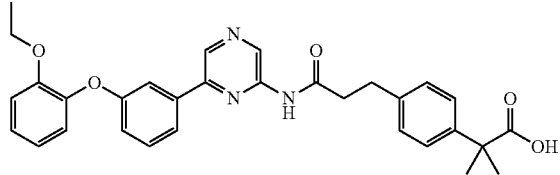 [SMILES: CCOc1ccccc1Oc1cccc(-c2cncc(NC(=O)CCc3ccc(C(C)(C)C(=O)O)cc3)n2)c1]

2-Chloro-6-(3-(2-ethoxyphenoxy)phenyl)pyrazine (0.10 g, 0.306 mmol) obtained in Preparation Example 2 and benzyl 2-(4-(3-amino-3-oxopropyl)phenyl)-2-methylpropanoate (0.099 g, 0.306 mmol) obtained in Preparation Example 14 were used in a similar manner to Example 1 and Step 2 of Preparation Example 7 to obtain the desired product (yield: 31%).

$^1$H NMR (400 MHz, CHLOROFORM-D): δ9.44 (s, 1H), 8.68 (s, 1H), 8.34 (s, 1H), 7.58-7.45 (m, 2H), 7.39-7.27 (m, 3H), 7.17 (d, J=8.2 Hz, 2H), 7.10 (td, J=7.8, 1.5 Hz, 1H), 7.06-6.94 (m, 3H), 6.94-6.85 (m, 1H), 4.03 (q, J=7.0 Hz, 2H), 3.10-2.95 (m, 2H), 2.70 (t, J=7.5 Hz, 2H), 1.57 (s, 6H), 1.24 (t, J=6.6 Hz, 3H)

Example 17: Synthesis of (E)-2-(4-(3-((6-(3-(2-ethoxyphenoxy)phenyl)pyrazin-2-yl)amino)-3-oxo-pro-1-phen-1-yl)phenyl)-2-methylpropanoic acid

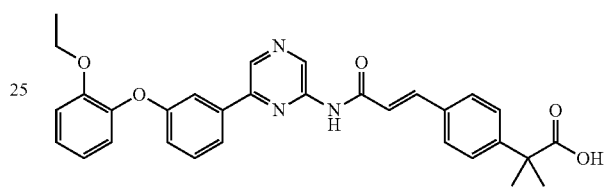

The title compound was obtained as a by-product in the process of obtaining Example 16 (yield: 41%).

$^1$H NMR (400 MHz, CHLOROFORM-D): δ9.60 (s, 1H), 8.92 (d, J=31.1 Hz, 1H), 8.70 (d, J=0.9 Hz, 1H), 7.84-7.72 (m, 1H), 7.61-7.42 (m, 6H), 7.38 (td, J=7.9, 2.4 Hz, 1H), 7.19-7.10 (m, 1H), 7.10-6.97 (m, 3H), 6.97-6.87 (m, 1H), 6.59 (d, J=15.6 Hz, 1H), 4.08-3.99 (m, 2H), 1.63 (s, 6H), 1.33-1.19 (m, 3H)

Example 18: Synthesis of 3-(4-(1-((6-(3-(2-ethoxyphenoxy)phenyl)pyrazin-2-yl)amino)-2-methyl-1-oxopropan-2-yl)phenyl)-2,2-dimethylpropanoic acid

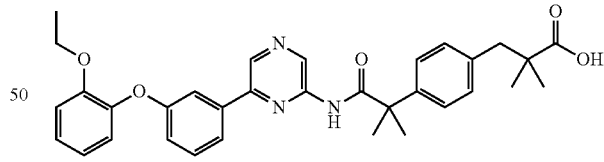

2-Chloro-6-(3-(2-ethoxyphenoxy)phenyl)pyrazine (0.10 g, 0.306 mmol) obtained in Preparation Example 2 and tert-butyl 3-(4-(1-amino-2-methyl-1-oxopropan-2-yl)phenyl)-2,2-dimethylpropanoate (0.098 g, 0.306 mmol) obtained in Preparation Example 15 were used in a similar manner to Example 1 and Step 3 of Preparation Example 11 to obtain the desired product (yield: 77%).

$^1$H NMR (400 MHz, CHLOROFORM-D): δ9.46 (s, 1H), 8.69-8.60 (m, 1H), 7.57 (s, 1H), 7.53-7.44 (m, 2H), 7.36-7.26 (m, 3H), 7.19 (d, J=8.7 Hz, 2H), 7.15-7.06 (m, 1H), 6.98 (ddd, J=8.0, 5.0, 1.6 Hz, 2H), 6.94-6.85 (m, 2H), 4.01 (q, J=7.0 Hz, 2H), 2.88 (s, 2H), 1.66 (s, 6H), 1.28-1.13 (m, 9H)

Example 19: Synthesis of 2-(4-(2-((6-(3-(2-ethoxyphenoxy)phenyl)pyrazin-2-yl)amino)-2-oxoethyl)phenoxy-2-methylpropanoic acid

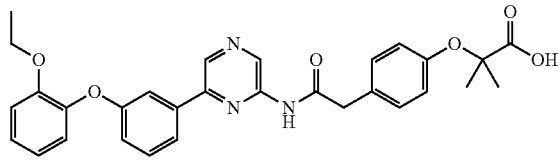 [SMILES: CCOc1ccccc1Oc1cccc(-c2cncc(NC(=O)Cc3ccc(OC(C)(C)C(=O)O)cc3)n2)c1]

2-Chloro-6-(3-(2-ethoxyphenoxy)phenyl)pyrazine (0.08 g, 0.245 mmol) obtained in Preparation Example 2 and tert-butyl 2-(4-(2-amino-2-oxoethyl)phenoxy)-2-methylpropanoate (0.072 g, 0.245 mmol) obtained in Preparation Example 16 were used in a similar manner to Example 1 and Step 3 of Preparation Example 11 to obtain the desired product (yield: 62%).

$^1$H-NMR (400 MHz, CHLOROFORM-D): δ9.42 (s, 1H), 8.67 (s, 1H), 8.40 (d, J=12.3 Hz, 1H), 7.54-7.42 (m, 2H), 7.32 (td, J=7.9, 2.0 Hz, 1H), 7.20 (q, J=4.0 Hz, 2H), 7.16-7.05 (m, 1H), 7.04-6.84 (m, 6H), 4.02 (qd, J=7.0, 1.5 Hz, 2H), 3.69 (d, J=2.7 Hz, 2H), 1.59 (d, J=15.1 Hz, 6H), 1.30-1.16 (m, 3H)

Example 20: Synthesis of 2-(4-(2-((6-(3-(2-ethoxyphenoxy)phenyl)pyrazin-2-yl)amino)pyrimidin-4-yl)phenyl)acetic acid

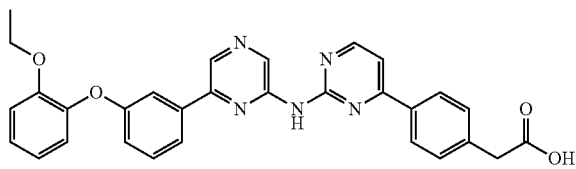 [SMILES: CCOc1ccccc1Oc1cccc(-c2cncc(Nc3nccc(-c4ccc(CC(=O)O)cc4)n3)n2)c1]

2-Chloro-6-(3-(2-ethoxyphenoxy)phenyl)pyrazine (0.140 g, 0.428 mmol) obtained in Preparation Example 2 and ethyl 2-(4-(2-aminopyrimidin-4-yl)phenyl)acetate (0.1 g, 0.389 mmol) obtained in Preparation Example 17 were used in a similar manner to Example 1 and Example 3 to obtain the desired product (yield: 0.69%).

m/z (M+H)$^+$ calculated for $C_{30}H_{25}N_5O_4$: 519.56, found 520.1

Example 21: Synthesis of (1r,4r)-4-((2-((6-(3-(2-ethoxyphenoxy)phenyl)pyrazin-2-yl)amino)pyrimidin-4-yl)oxy)cyclohexane-1-carboxylic acid

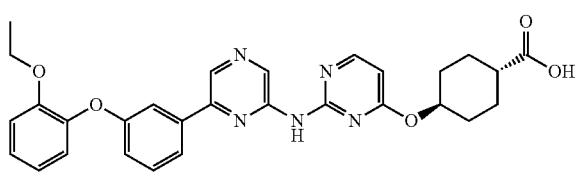 [SMILES: CCOc1ccccc1Oc1cccc(-c2cncc(Nc3nccc(O[C@H]4CC[C@H](C(=O)O)CC4)n3)n2)c1]

2-Chloro-6-(3-(2-ethoxyphenoxy)phenyl)pyrazine (0.100 g, 0.306 mmol) obtained in Preparation Example 2 and methyl (1r,4r)-4-((2-aminopyrimidin-4-yl)oxy)cyclohexane-1-carboxylate (0.085 g, 0.337 mmol) obtained in Preparation Example 18 were used in a similar manner to Example 1 and Example 3 sequentially to obtain the desired product (yield: 22.8%).

$^1$H-NMR (400 MHz, DMSO-D6): δ10.09 (s, 1H), 9.38 (s, 1H), 8.75 (s, 1H), 8.25 (d, J=5.9 Hz, 1H), 7.78 (d, J=8.2 Hz, 1H), 7.70 (t, J=2.1 Hz, 1H), 7.41 (t, J=8.0 Hz, 1H), 7.21-7.10 (m, 2H), 7.08-7.01 (m, 1H), 7.00-6.91 (m, 1H), 6.85 (dd, J=7.8, 2.3 Hz, 1H), 6.43-6.33 (m, 1H), 4.95 (dd, J=10.3, 4.3 Hz, 1H), 4.00 (q, J=6.9 Hz, 2H), 2.18 (s, 1H), 2.11 (d, J=7.8 Hz, 2H), 1.93 (d, J=9.6 Hz, 2H), 1.55-1.34 (m, 4H), 1.12 (t, J=7.1 Hz, 3H)

Example 22: Synthesis of N-(6-(6-(2-ethoxyphenoxy)pyridin-2-yl)pyrazin-2-yl)-3-phenylpropanamide

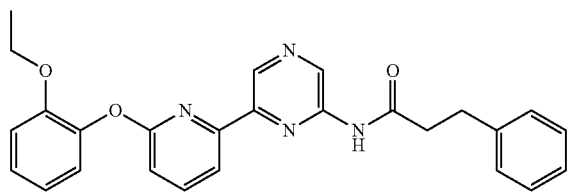

2-Chloro-6-(6-(2-ethoxyphenoxy)pyridin-2-yl)pyrazine (0.1 g, 0.305 mmol) obtained in Preparation Example 3 and 3-phenylpropanamide (0.059 g, 0.397 mmol) obtained in Preparation Example 5 were used in a similar manner to Example 1 to obtain the desired product (yield: 52.1%).

m/z (M+H)$^+$ calculated for $C_{26}H_{24}N_4O_3$: 440.50, found 441.1

Example 23: Synthesis of 3-(4-(2-((6-(6-(2-ethoxyphenoxy)pyridin-2-yl)pyrazin-2-yl)amino)-2-oxoethyl)phenyl)-2,2-dimethylpropanoic acid

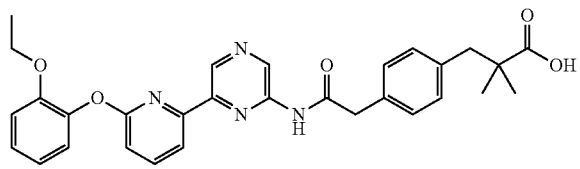 [SMILES: CCOc1ccccc1Oc1cccc(-c2cncc(NC(=O)Cc3ccc(CC(C)(C)C(=O)O)cc3)n2)n1]

2-Chloro-6-(6-(2-ethoxyphenoxy)pyridin-2-yl)pyrazine (0.070 g, 0.214 mmol) obtained in Preparation Example 3 and tert-butyl 3-(4-(2-amino-2-oxoethyl)phenyl)-2,2-dimethylpropanoate (0.056 g, 0.194 mmol) obtained in Preparation Example 10 were used in a similar manner to Example 1 and Step 3 of Preparation Example 11 to obtain the desired product (yield: 74.4%).

$^1$H-NMR (500 MHz, METHANOL-D4): δ9.32 (s, 1H), 8.75 (s, 1H), 8.05 (d, J=7.6 Hz, 1H), 7.99-7.85 (1H), 7.30 (d, J=8.2 Hz, 2H), 7.28-7.23 (m, 1H), 7.23-7.16 (3H), 7.13 (d, J=6.7 Hz, 1H), 7.10-6.96 (m, 2H), 3.99 (q, J=6.9 Hz, 2H), 3.79 (s, 2H), 2.87 (s, 2H), 1.17 (s, 7H), 1.09 (t, J=6.9 Hz, 4H)

Example 24: Synthesis of (R)-1-(2-((6-(6-(2-ethoxyphenoxy)pyridin-2-yl)pyrazin-2-yl)amino)pyrimidin-4-yl)piperidine-3-carboxylic acid

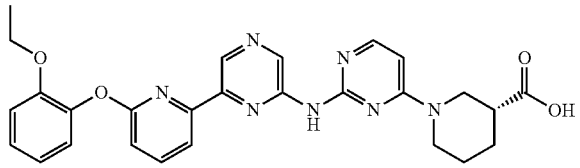 [SMILES: CCOc1ccccc1Oc1cccc(-c2cncc(Nc3nccc(N4CCC[C@@H](C(=O)O)C4)n3)n2)n1]

2-Chloro-6-(6-(2-ethoxyphenoxy)pyridin-2-yl)pyrazine (0.070 g, 0.214 mmol) obtained in Preparation Example 3 and ethyl (R)-1-(2-aminopyrimidin-4-yl)piperidine-3-carboxylate (0.048 g, 0.194 mmol) were used in a similar manner to Example 1 and Example 3 to obtain the desired product (yield: 20%).

$^1$H-NMR (400 MHz, METHANOL-D4): δ9.40 (s, 1H), 8.54 (s, 1H), 8.00 (d, J=7.8 Hz, 1H), 7.93 (d, J=6.4 Hz, 1H), 7.85 (t, J=7.8 Hz, 1H), 7.19 (t, J=8.0 Hz, 1H), 7.15 (dd, J=7.8, 1.4 Hz, 1H), 7.07 (d, J=6.9 Hz, 1H), 6.98 (t, J=7.1 Hz, 1H), 6.93 (d, J=8.2 Hz, 1H), 6.36 (d, J=6.4 Hz, 1H), 4.61-4.32 (1H), 4.29-4.04 (1H), 3.94 (q, J=7.0 Hz, 2H), 3.26-3.01 (m, 2H), 2.41 (t, J=3.9 Hz, 1H), 2.08 (t, J=4.8 Hz, 1H), 1.87-1.68 (m, 2H), 1.52 (d, J=12.8 Hz, 1H), 1.04 (t, J=6.9 Hz, 3H)

Example 25: Synthesis of 3-(3-(6-((6-(6-(2-ethoxyphenoxy)pyridin-2-yl)pyrazin-2-yl)amino)pyridin-2-yl)phenyl)-2,2-dimethylpropanoic acid

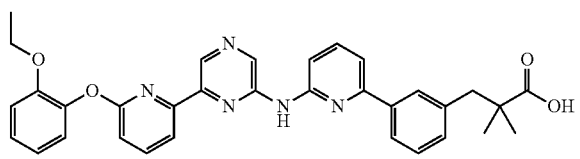 [SMILES: CCOc1ccccc1Oc1cccc(-c2cncc(Nc3cccc(-c4cccc(CC(C)(C)C(=O)O)c4)n3)n2)n1]

2-Chloro-6-(6-(2-ethoxyphenoxy)pyridin-2-yl)pyrazine (0.140 g, 0.427 mmol) obtained in Preparation Example 3 and tert-butyl 3-(3-(6-aminopyridin-2-yl)phenyl)-2,2-dimethylpropanoate (0.127 g, 0.388 mmol) obtained in Preparation Example 12 were used in a similar manner to Example 1 and Step 3 of Preparation Example 11 to obtain the desired product (yield: 16%).

$^1$H-NMR (400 MHz, METHANOL-D4) δ9.40 (s, 1H), 8.57-8.44 (1H), 8.06 (d, J=6.9 Hz, 1H), 7.98-7.89 (2H), 7.89-7.82 (m, 1H), 7.76 (t, J=8.0 Hz, 1H), 7.43 (dd, J=10.5, 7.8 Hz, 2H), 7.35 (t, J=7.5 Hz, 1H), 7.30-7.20 (m, 2H), 7.20-7.14 (m, 1H), 7.11 (d, J=8.2 Hz, 1H), 7.01 (t, J=7.5 Hz, 1H), 6.96 (d, J=8.2 Hz, 1H), 4.54 (s, 1H), 3.97 (q, J=7.0 Hz, 2H), 3.46 (s, 1H), 2.95 (s, 2H), 1.19 (s, 7H), 1.06 (t, J=6.9 Hz, 3H)

Example 26: Synthesis of 2-(4-(3-((6-(3-((3-ethoxypyridin-2-yl)oxy)phenyl)pyrazin-2-yl)amino)-3-oxopropyl)phenyl)-2-methylpropanoic acid

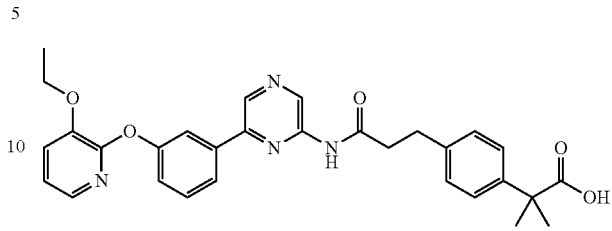

2-Chloro-6-(3-((3-ethoxypyridin-2-yl)oxy)phenyl)pyrazine (0.08 g, 0.244 mmol) obtained in Preparation Example 4 and benzyl 2-(4-(3-amino-3-oxopropyl)phenyl)-2-methylpropanoate (0.079 g, 0.244 mmol) obtained in Preparation Example 14 were used in a similar manner to Example 1 and Step 2 of Preparation Example 7 to obtain the desired product (yield: 16%).

$^1$H-NMR (400 MHz, CHLOROFORM-D): δ9.41 (s, 1H), 8.68 (s, 1H), 8.25 (d, J=8.2 Hz, 1H), 7.73 (d, J=5.0 Hz, 1H), 7.64 (q, J=2.1 Hz, 2H), 7.48-7.38 (m, 1H), 7.30-7.09 (m, 6H), 6.97 (dd, J=7.8, 5.0 Hz, 1H), 4.19-4.11 (m, 2H), 3.01 (t, J=7.5 Hz, 2H), 2.71 (t, J=7.5 Hz, 2H), 1.52 (s, 6H), 1.46 (t, J=7.1 Hz, 3H)

Example 27: Synthesis of 3-(4-(2-((6-(3-((3-ethoxypyridin-2-yl)oxy)phenyl)pyrazin-2-yl)amino)-2-oxoethyl)phenyl)-2,2-dimethylpropanoic acid

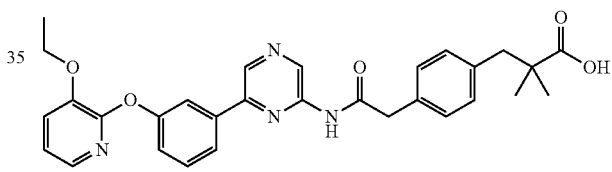

2-Chloro-6-(3-((3-ethoxypyridin-2-yl)oxy)phenyl)pyrazine (0.08 g, 0.244 mmol) obtained in Preparation Example 4 and tert-butyl 3-(4-(2-amino-2-oxoethyl)phenyl)-2,2-dimethylpropanoate (0.071 g, 0.244 mmol) obtained in Preparation Example 10 were used in a similar manner to Example 1 and Step 3 of Preparation Example 11 to obtain the desired product (yield: 62%).

$^1$H-NMR (400 MHz, CHLOROFORM-D): δ9.42 (s, 1H), 8.70 (s, 1H), 8.37 (s, 1H), 7.76-7.69 (m, 1H), 7.68-7.61 (m, 2H), 7.43 (t, J=8.2 Hz, 1H), 7.23-7.10 (m, 6H), 6.97 (dd, J=7.8, 5.0 Hz, 1H), 4.18-4.07 (m, 2H), 3.72 (s, 2H), 2.85 (s, 2H), 1.49-1.41 (m, 3H), 1.19 (s, 6H)

Example 28: Synthesis of 2-(4-(3-((6-(3-((3-ethoxypyridin-2-yl)oxy)phenyl)pyrazin-2-yl)amino)-3-oxopropyl)phenoxy)-2-methylpropanoic acid

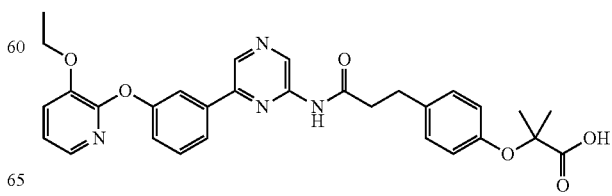

2-Chloro-6-(3-((3-ethoxypyridin-2-yl)oxy)phenyl)pyrazine (0.08 g, 0.244 mmol) obtained in Preparation Example 4 and tert-butyl 2-(4-(3-amino-3-oxopropyl)phenoxy)-2-methylpropanoate (0.075 g, 0.244 mmol) obtained in Preparation Example 13 were used in a similar manner to Example 1 and Step 3 of Preparation Example 11 to obtain the desired product (yield: 56%).

$^1$H-NMR (400 MHz, DMSO-D6): δ10.74 (s, 1H), 9.26 (s, 1H), 8.93 (s, 1H), 7.92 (d, J=7.8 Hz, 1H), 7.81 (t, J=1.8 Hz, 1H), 7.60 (dd, J=5.0, 1.4 Hz, 1H), 7.56-7.41 (m, 2H), 7.18 (dd, J=7.5, 2.1 Hz, 1H), 7.13-7.00 (m, 3H), 6.78-6.65 (m, 2H), 4.11 (q, J=7.0 Hz, 2H), 2.87-2.76 (m, 2H), 2.69 (t, J=7.5 Hz, 2H), 1.42 (s, 6H), 1.33 (t, J=7.1 Hz, 3H)

Example 29: Synthesis of 3-(4-(1-((6-(3-((3-ethoxypyridin-2-yl)oxy)phenyl)pyrazin-2-yl)amino)-2-methyl-1-oxopropane-2-yl)phenyl)-2,2-dimethylpropanoic acid

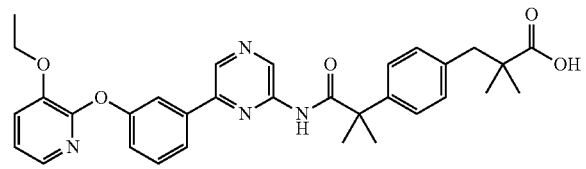 [SMILES: CCOc1cccnc1Oc1cccc(-c2cncc(NC(=O)C(C)(C)c3ccc(CC(C)(C)C(=O)O)cc3)n2)c1]

2-Chloro-6-(3-((3-ethoxypyridin-2-yl)oxy)phenyl)pyrazine (0.08 g, 0.244 mmol) obtained in Preparation Example 4 and tert-butyl 3-(4-(1-amino-2-methyl-1-oxopropan-2-yl)phenyl)-2,2-dimethylpropanoate (0.078 g, 0.244 mmol) obtained in Preparation Example 15 were used in a similar manner to Example 1 and Step 3 of Preparation Example 11 to obtain the desired product (yield: 59%).

$^1$H NMR (400 MHz, CHLOROFORM-D): δ9.43 (s, 1H), 8.68 (s, 1H), 7.72-7.59 (m, 3H), 7.56 (s, 1H), 7.41 (t, J=8.2 Hz, 1H), 7.29 (d, J=8.2 Hz, 2H), 7.23-7.07 (m, 4H), 7.00-6.88 (m, 1H), 4.18-4.05 (m, 2H), 2.84 (s, 2H), 1.65 (s, 6H), 1.44 (t, J=6.9 Hz, 3H), 1.16 (s, 6H)

Example 30: Synthesis of 2-(4-(2-((6-(3-((3-ethoxypyridin-2-yl)oxy)phenyl)pyrazin-2-yl)amino)-2-oxoethyl)phenoxy)-2-methylpropanoic acid

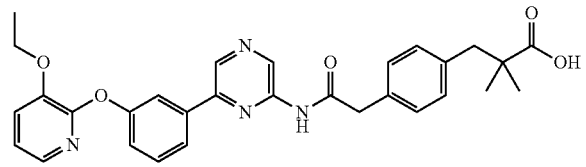 [SMILES: CCOc1cccnc1Oc1cccc(-c2cncc(NC(=O)Cc3ccc(CC(C)(C)C(=O)O)cc3)n2)c1]

2-Chloro-6-(3-((3-ethoxypyridin-2-yl)oxy)phenyl)pyrazine (0.08 g, 0.244 mmol) obtained in Preparation Example 4 and tert-butyl 2-(4-(2-amino-2-oxoethyl)phenoxy)-2-methylpropanoate (0.072 g, 0.244 mmol) obtained in Preparation Example 16 were used in a similar manner to Example 1 and Step 3 of Preparation Example 11 to obtain the desired product (yield: 35%).

$^1$H-NMR (400 MHz, DMSO-D6): δ10.94 (s, 1H), 9.23 (s, 1H), 8.94 (s, 1H), 7.93 (d, J=8.2 Hz, 1H), 7.83 (t, J=1.8 Hz, 1H), 7.61 (dd, J=5.0, 1.4 Hz, 1H), 7.58-7.43 (m, 2H), 7.19 (d, J=8.7 Hz, 3H), 7.07 (dd, J=8.0, 4.8 Hz, 1H), 6.74 (d, J=8.7 Hz, 2H), 4.20-4.07 (m, 2H), 3.66 (s, 2H), 1.45 (s, 6H), 1.33 (t, J=7.1 Hz, 3H)

Example 31: Synthesis of (R)-1-(2-((6-(3-((3-ethoxypyridin-2-yl)oxy)pheny)pyrazin-2-yl)amino)pyrimidin-4-yl)piperidine-3-carboxylic acid

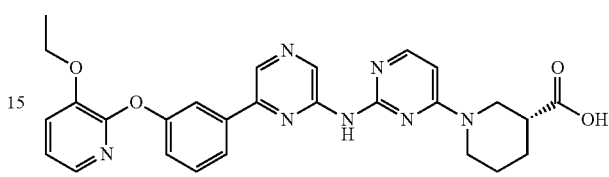

2-Chloro-6-(3-((3-ethoxypyridin-2-yl)oxy)phenyl)pyrazine (0.08 g, 0.244 mmol) obtained in Preparation Example 4 and ethyl (R)-1-(2-aminopyrimidin-4-yl)piperidine-3-carboxylate (0.055 g, 0.222 mmol) obtained in Preparation Example 11 were used in a similar manner to Example 1 and Example 3 to obtain the desired product (yield: 20%)).

$^1$H-NMR (400 MHz, METHANOL-D4): δ9.36 (s, 1H), 8.61 (s, 1H), 7.96 (d, J=6.4 Hz, 1H), 7.86 (d, J=7.8 Hz, 1H), 7.77 (t, J=2.1 Hz, 1H), 7.66 (dd, J=4.8, 1.6 Hz, 1H), 7.51 (d, J=7.8 Hz, 1H), 7.46 (dd, J=8.5, 2.1 Hz, 1H), 7.11 (dd, J=8.0, 4.8 Hz, 2H), 6.41 (d, J=6.4 Hz, 1H), 4.48-4.29 (1H), 4.29-4.17 (1H), 4.13 (q, J=7.0 Hz, 2H), 3.35 (d, J=9.1 Hz, 1H), 3.23-2.96 (1H), 2.52-2.39 (1H), 2.07 (s, 1H), 1.80 (d, J=10.5 Hz, 1H), 1.57 (d, J=3.7 Hz, 1H), 1.37 (t, J=7.1 Hz, 3H)

Example 32: Synthesis of 3-(3-(6-((6-(3-((3-ethoxypyridin-2-yl)oxy)phenyl)pyrazin-2-yl)amino)pyridin-2-yl)phenyl)-2,2-dimethylpropanoic acid

2-Chloro-6-(3-((3-ethoxypyridin-2-yl)oxy)phenyl)pyrazine (0.08 g, 0.244 mmol) obtained in Preparation Example 4 and tert-butyl 3-(3-(6-aminopyridin-2-yl)phenyl)-2,2-dimethylpropanoate (0.072 g, 0.222 mmol) obtained in Preparation Example 12 were used in a similar manner to Example 1 and Step 3 of Preparation Example 11 to obtain the desired product (yield: 26%).

$^1$H-NMR (400 MHz, METHANOL-D4): δ9.40 (s, 1H), 8.62-8.47 (1H), 7.91 (s, 1H), 7.86 (t, J=8.5 Hz, 2H), 7.80 (d, J=2.3 Hz, 1H), 7.76-7.59 (m, 2H), 7.58-7.43 (m, 2H), 7.43-7.27 (m, 3H), 7.21 (d, J=8.2 Hz, 1H), 7.13 (td, J=5.1, 2.7 Hz, 2H), 4.22-4.10 (m, 2H), 2.96 (s, 2H), 1.36 (t, J=6.9 Hz, 3H), 1.20 (s, 7H)

Example 33: Synthesis of (1r,4r)-4-((2-((6-(3-((3-ethoxypyridin-2-yl)oxy)phenyl)pyrazin-2-yl)amino)pyrimidin-4-yl)oxy)cyclohexane-1-carboxylic acid

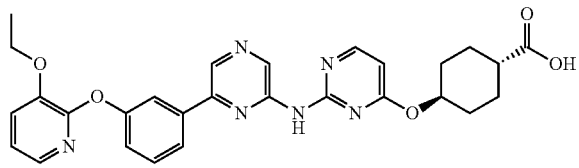

2-Chloro-6-(3-((3-ethoxypyridin-2-yl)oxy)phenyl)pyrazine (0.10 g, 0.305 mmol) obtained in Preparation Example 4 and methyl (1r,4r)-4-((2-aminopyrimidin-4-yl)oxy)cyclohexane-1-carboxylate (0.084 g, 0.336 mmol) obtained in Preparation Example 18 were used in a similar manner to Example 1 and Example 3 sequentially to obtain the desired product (yield: 42.2%).

$^1$H-NMR (400 MHz, DMSO-D6): δ10.09 (s, 1H), 9.40 (s, 1H), 8.82 (s, 1H), 8.26 (d, J=5.5 Hz, 1H), 7.94 (d, J=7.8 Hz, 1H), 7.86 (t, J=2.1 Hz, 1H), 7.61 (dd, J=5.0, 1.4 Hz, 1H), 7.55-7.43 (m, 2H), 7.16 (dd, J=7.5, 2.1 Hz, 1H), 7.07 (dd, J=8.0, 4.8 Hz, 1H), 6.36 (d, J=5.9 Hz, 1H), 4.96 (t, J=4.8 Hz, 1H), 4.12 (q, J=7.0 Hz, 2H), 2.24-2.05 (m, 3H), 1.93 (d, J=9.6 Hz, 2H), 1.56-1.37 (4H), 1.33 (t, J=7.1 Hz, 3H)

Experimental Example: Measurement of Inhibitory Effect Against DGAT2 Enzyme Activity The inhibitory effect against the DGAT2 enzyme activity was investigated by performing the following experiment on the compounds of Formula (1) according to the present invention.

1. Preparation of DGAT2 Expression Vector

In order to prepare the pBacPAK9-DGAT2, which is DGAT2 expression vector, the human DGAT2 gene amplified by polymerase chain reaction (PCR) was cloned into the EcoR1 and Xho1 sites of the pBacPAK9 (clonctech) vector. The nucleotide sequence of the primers used in PCR was the forward primer 5' CTATAAATACGGATCCCGGGAATT-CATGGACTACAAGGACGACGATGACAAGCTTAAG ACCCTCATAGCCGCC and the reverse primer 5' TAAGCGGCCGCCCTGCAGGCCTCGAGTCAGTT-CACCTCCAGGAC. The composition of the reaction solution was to contain 50 ng of cDNA clone (OriGene), 200 μM of dATP, dCTP, dTTP, dGTP, 200 nM of each primer, 1 unit of Tag DNA Polymerase (Toyobo), 1×PCR buffer, and the final volume was adjusted to 20 μl. The reaction conditions were denatured at 95° C. for 5 minutes, followed by 30 times of 94° C. for 20 seconds, 60° C. for 20 seconds, and 72° C. for 90 seconds, followed by further reaction at 72° C. for 7 minutes.

2. DGAT2 Expression and Preparation of Membrane Protein

Recombinant human DGAT2 protein was expressed in Sf-21 cells, which are insect cells, by using the BacPack baculovirus expression system (Clontech). The brief manufacturing process is as follows. First, the pBacPAK9-DGAT2 expression vector was transfected with BacPAK6 virus DNA (Bsu36I digest) into sf21 cells using Bacfectin to prepare a recombinant DGAT2 expressing baculovirus. The thus prepared baculovirus was infected with Sf-21 cells at 10 MOI (multiplicity of infection), and after 72 hours, infected insect cells were collected and membrane proteins were isolated. For membrane protein separation, the cell pellet was dissolved in a sucrose solution containing 250 mM sucrose, 10 mM Tris (pH 7.4), and 1 mM ethylenediaminetetraacetic acid (EDTA), and then homogenized by using a dounce homogenizer, and the supernatant was taken by centrifuging at 600×g for 15 minutes, and centrifuged at 100,000×g for 1 hour to discard the supernatant, and the remaining pellet was resuspended in 20 mM HEPES buffer (pH 7.4). The prepared DGAT2 overexpressing membrane protein was dispensed in 100 μl and stored at −80° C. until use. Protein concentration was quantified by using the BCA Protein Assay Kit (Thermo Scientific).

3. Measurement of Inhibitory Effect Against DGAT2 Enzyme Activity

In vitro DGAT2 analysis was performed using a Phospholipid Flash Plate (PerkinElmer) based on the principle of SPA (Scintillation Proximity Assay). First, DGAT2 inhibition compounds serially diluted 5 times from 3 nM to 10 μM (final concentration, 1% DMSO) were mixed in a buffer solution containing 2 μg DGAT2-membrane protein and 20 mM HEPES, 20 mM MgCl$_2$, 1 mg/mL BSA, 50 μM 1,2 sn-oleoyl glycerol (Sigma), put in a 96-well flash plate (FlashPlate) and reacted at 37° C. for 20 minutes, and then 1 μM [14C] ole oil CoA (PerkinElmer, NEC651050UC) was added to be a final volume of 100 μL and further reacted at 37° C. for 15 minutes. After the enzymatic reaction was completed, 100 μL of isopropanol was added, the plate was sealed with a film, and the plate was shaken slowly in a plate shaker. The next day, the amplified scintillation signal (cpm) in Topcounter (Packard) was measured to measure the degree of production of [14C]-labeled triacyl glycerol (TG) as a reaction product. The measured value when the compound was not treated was used as a positive control, and the measured value of the compound treated group was calculated as a relative % to measure the inhibition effect of the compound on TG production. The IC$_{50}$ value, which is the concentration of the compound that inhibits TG production by 50%, was determined by treating the response value according to the compound concentration with a nonlinear regression curve using PRISM (Graphpad Inc.).

As a result of measuring the inhibition effect on the DGAT2 enzyme action for the compound of formula (1), specific IC$_{50}$ values of the individual Example compounds were as shown in Table 1 below.

TABLE 1

| Example | IC$_{50}$ (μM) |
|---|---|
| 1 | 0.035 |
| 2 | 0.027 |
| 3 | 3.4 |
| 4 | 0.29 |
| 5 | 0.011 |
| 6 | 0.12 |
| 7 | 0.036 |
| 8 | 1.8 |
| 9 | 0.16 |
| 10 | 0.019 |
| 11 | 0.37 |
| 12 | 0.17 |
| 13 | 0.33 |
| 14 | 3.1 |
| 15 | 0.013 |
| 16 | 0.021 |
| 17 | 0.24 |
| 18 | 0.022 |
| 19 | 0.43 |
| 20 | 3.9 |
| 21 | 1.2 |
| 22 | 2.1 |
| 23 | 0.061 |

TABLE 1-continued

| Example | IC$_{50}$ (µM) |
|---|---|
| 24 | 7.4 |
| 25 | 0.45 |
| 26 | 0.021 |
| 27 | 0.0074 |
| 28 | 0.21 |
| 29 | 0.0067 |
| 30 | 0.25 |
| 31 | 9.2 |
| 32 | 0.07 |
| 33 | 3.4 |

The invention claimed is:

1. A compound of the following Formula (1), or a pharmaceutically acceptable salt or isomer thereof:

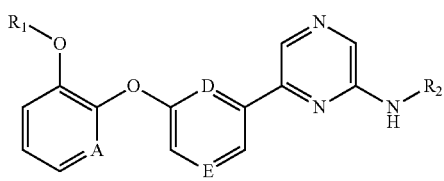

[Formula (1)]

wherein
A, D and E are each independently CH or N;
R$_1$ is alkyl, cycloalkyl or haloalkyl; and
R$_2$ is -G-J-L;
wherein G is —C(=O)— or a direct bond;
J is alkylene, alkenylene, alkylene-arylene, alkenylene-arylene, alkoxyene-arylene, arylene, heteroarylene-heterocycloalkylene, heteroarylene-arylene or heteroarylene-oxy-cycloalkylene; and
L is hydrogen, halo, amino, nitro, carboxy (—COOH), carboxyalkyl, carboxyalkoxy, cycloalkyl or aryl; and
wherein the alkyl, alkylene, carboxyalkyl, carboxyalkoxy or aryl is optionally substituted with one or more substituents selected from hydroxy, halo, alkyl and alkoxy; and
the heterocycloalkylene or heteroarylene includes one or more heteroatoms selected from N, O and S.

2. The compound, or a pharmaceutically acceptable salt or isomer thereof according to claim 1, wherein
R$_1$ is C$_1$-C$_7$ alkyl, C$_3$-C$_{10}$ cycloalkyl or halo-C$_1$-C$_7$ alkyl; and
R$_2$ is -G-J-L;
wherein
J is C$_1$-C$_7$ alkylene, C$_2$-C$_7$ alkenylene, C$_1$-C$_7$ alkylene-C$_6$-C$_{10}$ arylene, C$_2$-C$_7$ alkenylene-C$_6$-C$_{10}$ arylene, C$_1$-C$_7$ alkoxyene-C$_6$-C$_{10}$ arylene, C$_6$-C$_{10}$ arylene, 5- to 12-membered heteroarylene-5- to 12-membered heterocycloalkylene, 5- to 12-membered heteroarylene-C$_6$-C$_{10}$ arylene or 5- to 12-membered heteroarylene-oxy-C$_3$-C$_{10}$ cycloalkylene; and
L is hydrogen, halo, amino, nitro, carboxy, carboxy-C$_1$-C$_7$ alkyl, carboxy-C$_1$-C$_7$ alkoxy, C$_3$-C$_{10}$ cycloalkyl or C$_6$-C$_{10}$ aryl; and
wherein the alkyl, alkylene, carboxyalkyl, carboxyalkoxy or aryl is optionally substituted with 1 to 4 substituents selected from hydroxy, halo, C$_1$-C$_7$ alkyl and C$_1$-C$_7$ alkoxy; and
the heterocycloalkylene or heteroarylene includes 1 to 4 heteroatoms selected from N, O and S.

3. The compound, or a pharmaceutically acceptable salt or isomer thereof according to claim 1, wherein the compound is selected from the following group:
N-(6-(5-(2-ethoxyphenoxy)pyridin-3-yl) pyrazin-2-yl)-3-phenylpropanamide;
methyl 2-(4-(2-((6-(5-(2-ethoxyphenoxy)pyridin-3-yl) pyrazin-2-yl)amino)-2-oxoethyl)phenyl)acetate;
2-(4-(2-((6-(5-(2-ethoxyphenoxy)pyridin-3-yl) pyrazin-2-yl)amino)-2-oxoethyl)phenyl) acetic acid;
2-(4-(3-((6-(5-(2-ethoxyphenoxy)pyridin-3-yl) pyrazin-2-yl)amino)-3-oxopropyl)phenyl) acetic acid;
methyl 2-(4-(3-((6-(5-(2-ethoxyphenoxy)pyridin-3-yl) pyrazin-2-yl)amino)-3-oxopropyl)phenyl)-2-methylpropanoate;
ethyl 2-(4-(2-((6-(5-(2-ethoxyphenoxy)pyridin-3-yl) pyrazin-2-yl)amino)-2-oxoethyl)phenyl)-2,2-difluoroacetate;
3-(4-(2-((6-(5-(2-ethoxyphenoxy)pyridin-3-yl) pyrazin-2-yl)amino)-2-oxoethyl)phenyl)-2,2-dimethylpropanoic acid;
(R)-1-(2-((6-(5-(2-ethoxyphenoxy)pyridin-3-yl) pyrazin-2-yl)amino) pyrimidin-4-yl) piperidine-3-carboxylic acid;
3-(3-(6-((6-(5-(2-ethoxyphenoxy)pyridin-3-yl) pyrazin-2-yl)amino) pyridin-2-yl)phenyl)-2,2-dimethylpropanoic acid;
N-(6-(3-(2-ethoxyphenoxy)phenyl) pyrazin-2-yl)-3-phenylpropanamide;
2-(4-(2-((6-(3-(2-ethoxyphenoxy)phenyl) pyrazin-2-yl) amino)-2-oxoethyl)phenyl) acetic acid;
2-(4-(3-((6-(3-(2-ethoxyphenoxy)phenyl) pyrazin-2-yl) amino)-3-oxopropyl)phenyl) acetic acid;
2-(4-(3-((6-(3-(2-ethoxyphenoxy)phenyl) pyrazin-2-yl) amino)-3-oxopropyl) phenoxy)-2-methylpropanoic acid;
2-(4-(2-((6-(3-(2-ethoxyphenoxy)phenyl) pyrazin-2-yl) amino)-2-oxoethyl)phenyl-2,2-difluoroacetic acid;
3-(4-(2-((6-(3-(2-ethoxyphenoxy)phenyl) pyrazin-2-yl) amino)-2-oxoethyl)phenyl)-2,2-dimethylpropanoic acid;
2-(4-(3-((6-(3-(2-ethoxyphenoxy)phenyl) pyrazin-2-yl) amino)-3-oxopropyl)phenyl)-2-methylpropanoic acid;
(E)-2-(4-(3-((6-(3-(2-ethoxyphenoxy)phenyl) pyrazin-2-yl)amino)-3-oxopro-1-phen-1-yl)phenyl)-2-methylpropanoic acid;
3-(4-(1-((6-(3-(2-ethoxyphenoxy)phenyl) pyrazin-2-yl) amino)-2-methyl-1-oxopropan-2-yl)phenyl)-2,2-dimethylpropanoic acid;
2-(4-(2-((6-(3-(2-ethoxyphenoxy)phenyl) pyrazin-2-yl) amino)-2-oxoethyl) phenoxy-2-methylpropanoic acid;
2-(4-(2-((6-(3-(2-ethoxyphenoxy)phenyl) pyrazin-2-yl) amino) pyrimidin-4-yl)phenyl) acetic acid;
(1r,4r)-4-((2-((6-(3-(2-ethoxyphenoxy)phenyl) pyrazin-2-yl)amino) pyrimidin-4-yl)oxy) cyclohexane-1-carboxylic acid;
N-(6-(6-(2-ethoxyphenoxy)pyridin-2-yl) pyrazin-2-yl)-3-phenylpropanamide;
3-(4-(2-((6-(6-(2-ethoxyphenoxy)pyridin-2-yl) pyrazin-2-yl)amino)-2-oxoethyl)phenyl)-2,2-dimethylpropanoic acid;
(R)-1-(2-((6-(6-(2-ethoxyphenoxy)pyridin-2-yl) pyrazin-2-yl)amino) pyrimidin-4-yl) piperidine-3-carboxylic acid;
3-(3-(6-((6-(6-(2-ethoxyphenoxy)pyridin-2-yl) pyrazin-2-yl)amino) pyridin-2-yl)phenyl)-2,2-dimethylpropanoic acid;

2-(4-(3-((6-(3-((3-ethoxypyridin-2-yl)oxy) phenyl) pyrazin-2-yl)amino)-3-oxopropyl)phenyl)-2-methyl-propanoic acid;

3-(4-(2-((6-(3-((3-ethoxypyridin-2-yl)oxy) phenyl) pyrazin-2-yl)amino)-2-oxoethyl)phenyl)-2,2-dimethyl-propanoic acid;

2-(4-(3-((6-(3-((3-ethoxypyridin-2-yl)oxy) phenyl) pyrazin-2-yl)amino)-3-oxopropyl) phenoxy)-2-methyl-propanoic acid;

3-(4-(1-((6-(3-((3-ethoxypyridin-2-yl)oxy) phenyl) pyrazin-2-yl)amino)-2-methyl-1-oxopropane-2-yl)phenyl)-2,2-dimethylpropanoic acid;

2-(4-(2-((6-(3-((3-ethoxypyridin-2-yl)oxy) phenyl) pyrazin-2-yl)amino)-2-oxoethyl) phenoxy)-2-methyl-propanoic acid;

(R)-1-(2-((6-(3-((3-ethoxypyridin-2-yl)oxy) phenyl) pyrazin-2-yl)amino) pyrimidin-4-yl) piperidine-3-carboxylic acid;

3-(3-(6-((6-(3-((3-ethoxypyridin-2-yl)oxy) phenyl) pyrazin-2-yl)amino) pyridin-2-yl)phenyl)-2,2-dimethylpropanoic acid; and (1r,4r)-4-((2-((6-(3-((3-ethoxypyridin-2-yl)oxy) phenyl) pyrazin-2-yl)amino) pyrimidin-4-yl)oxy) cyclohexane-1-carboxylic acid.

4. A pharmaceutical composition for the treatment of diseases associated with diacylglycerol acyltransferase 2 (DGAT2) comprising the compound of Formula (1), or a pharmaceutically acceptable salt or isomer thereof as defined in claim 1 as an active ingredient, together with a pharmaceutically acceptable carrier.

5. The pharmaceutical composition according to claim 4, wherein the disease associated with DGAT2 is selected from the group consisting of fatty liver, nonalcoholic steatohepatitis (NASH), nonalcoholic fatty liver disease (NAFLD), diabetes, obesity, hyperlipidemia, atherosclerosis and hypercholesterolemia.

6. A pharmaceutical composition for the treatment of diseases associated with diacylglycerol acyltransferase 2 (DGAT2) comprising the compound of Formula (1), or a pharmaceutically acceptable salt or isomer thereof as defined in claim 2 as an active ingredient, together with a pharmaceutically acceptable carrier.

7. The pharmaceutical composition according to claim 6, wherein the disease associated with DGAT2 is selected from the group consisting of fatty liver, nonalcoholic steatohepatitis (NASH), nonalcoholic fatty liver disease (NAFLD), diabetes, obesity, hyperlipidemia, atherosclerosis and hypercholesterolemia.

8. A pharmaceutical composition for the treatment of diseases associated with diacylglycerol acyltransferase 2 (DGAT2) comprising the compound of Formula (1), or a pharmaceutically acceptable salt or isomer thereof as defined in claim 3 as an active ingredient, together with a pharmaceutically acceptable carrier.

9. The pharmaceutical composition according to claim 8, wherein the disease associated with DGAT2 is selected from the group consisting of fatty liver, nonalcoholic steatohepatitis (NASH), nonalcoholic fatty liver disease (NAFLD), diabetes, obesity, hyperlipidemia, atherosclerosis and hypercholesterolemia.

* * * * *